US006788426B1

(12) United States Patent
Yamanaka et al.

(10) Patent No.: US 6,788,426 B1
(45) **Date of Patent: *Sep. 7, 2004**

(54) IMAGE FORMING APPARATUS

(75) Inventors: Takashi Yamanaka, Yamatokoriyama (JP); Toyoaki Nanba, Higashiosaka (JP); Tomomi Tanaka, Yamatokoriyama (JP); Masao Matsui, Yamatokoriyama (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 390 days.

(21) Appl. No.: 08/953,488

(22) Filed: Oct. 17, 1997

(30) Foreign Application Priority Data

Oct. 17, 1996 (JP) ............................................ 8-274976

(51) Int. Cl.[7] ................................................ G06F 15/00

(52) U.S. Cl. ................... 358/1.15; 270/52.03; 271/298; 271/278; 271/279; 271/280

(58) Field of Search ................................ 395/114, 109, 395/115; 358/1.15, 1.9, 1.16; 270/52.03; 271/298, 278, 279, 280

(56) References Cited

U.S. PATENT DOCUMENTS

| | | | | |
|---|---|---|---|---|
| 5,328,169 A | * 7/1994 | Mandel | ...................... | 271/298 |
| 5,358,238 A | * 10/1994 | Mandel et al. | .............. | 271/298 |
| 5,547,178 A | * 8/1996 | Costello | .................. | 270/52.02 |
| 5,551,686 A | * 9/1996 | Sanchez et al. | ............. | 271/298 |
| 5,599,009 A | * 2/1997 | Mandel et al. | ........... | 270/58.09 |
| 5,603,492 A | * 2/1997 | Mandel et al. | ........... | 270/58.09 |
| 5,777,882 A | * 7/1998 | Salgado | ...................... | 271/298 |
| 5,823,529 A | * 10/1998 | Mandel et al. | .............. | 271/298 |

FOREIGN PATENT DOCUMENTS

| | | |
|---|---|---|
| JP | A-3267267 | 11/1991 |
| JP | 5-294544 | 11/1993 |
| JP | 7-187491 | 7/1995 |
| JP | 7-336489 | 12/1995 |

* cited by examiner

*Primary Examiner*—King Y. Poon
(74) *Attorney, Agent, or Firm*—Birch, Stewart, Kolasch & Birch, LLP

(57) ABSTRACT

Record sheets on which an image is formed on the basis of image data supplied from a terminal apparatus, are efficiently discharged to a bin. A post-process section of a digital copier which is used in conjunction with at least first to third computers includes first to third bins, fourth and fifth bins, and a sixth bin, respectively, which are designated for the first, second, and third computers. To each of the bins, a priority of discharging to the bin a record sheet which is to be discharged to another bin is assigned. The section is configured so that, for each of the bins, the number of record sheets housed in the bin can be detected. For example, a record sheet on which an image due to the third computer is drawn is usually housed in the sixth bin. If the sixth bin is full, the record sheet is discharged to one of bins which are not the sixth bin and which are not the first and fourth bins respectively dedicated to the first and second computers, i.e., one of the second, third, and fifth bins.

2 Claims, 15 Drawing Sheets

IMAGE FORMING APPARATUS

BACKGROUND OF THE INVENTION

1. Field of the Invention

The present invention relates to an image forming apparatus to be used in connection with to terminal apparatuses such as host computers, and having a mail box function or a post-process function of discharging record sheets on which an image is formed on the basis of digital image data supplied from one of the terminal apparatuses, to bins.

2. Description of the Related Art

Recently, an image forming apparatus such as a digital copier is configured as a composite apparatus to be used with being connected to terminal apparatuses which are a host computers such as personal computers or facsimile apparatuses. Such a composite apparatus has a function of copying an image of an original in a copy mode, and also an additional function of, in a printer mode or a facsimile (FAX) mode, forming an image on the basis of digital image data supplied from one of the terminal apparatuses.

Such an image forming apparatus having plural functions has also post-process functions including: a sorting function of receiving record sheets on which an image is copied in the copy mode, while sorting the record sheets in accordance with a predetermined instruction; and a mail box function of discharging a record sheet on which an image is formed on the basis of digital image data supplied from one of the terminal apparatuses, to a bin.

For example, Japanese Unexamined Patent Publication JP-A 3-267267(1991) discloses a printing apparatus having the above-mentioned functions. In the apparatus disclosed specifically in the publication, for each of the bins to which record sheets are to be discharged, information such as the intended purpose of the bin is stored and displayed. When image data is transmitted from a host computer, bin selection information contained in the image data is compared with the stored information such as the intended purpose, and a bin is selected. A record sheet on which an image is formed on the basis of the image data is discharged to the selected bin.

In the prior art image forming apparatus disclosed in the publication, record sheets are discharged to a bin which is designated for each terminal apparatus, and hence record sheets on which an image is formed on the basis of image data supplied from a predetermined terminal apparatus are discharged only to a designated bin. Therefore, record sheets on which image is formed on the basis of image data supplied from a terminal apparatus for which no bin is designated cannot be discharged. When a designated bin is filled with discharged record sheets, for example, record sheets cannot be further discharged even when bins designated for other terminal apparatus have room.

In the prior art image forming apparatus, when a bin is to be designated for a terminal apparatus, it is not clearly shown whether the bin is already designated for a certain terminal apparatus or not. Consequently, there is a fear that a bin for which a certain terminal apparatus is already designated is designated for another terminal apparatus.

SUMMARY OF THE INVENTION

It is an object of the invention to provide an image forming apparatus in which record sheets on which an image is formed on the basis of image data supplied from a terminal apparatus can be efficiently discharged to a bin, and a bin already designated for a certain terminal apparatus is prevented from being designated for another terminal apparatus.

The image forming apparatus of the invention comprises:

- image forming means for forming an image on a predetermined record sheet on the basis of image data supplied from one of connected terminal apparatuses;
- discharging means for discharging a record sheet on which an image is formed;
- bins which house discharged record sheets;
- bin designating means for designating a bin for each of the terminal apparatuses;
- record sheet number detecting means for detecting a number of record sheets housed in each of the bins;
- priority setting means for setting a priority of a bin to which a record sheet is to be discharged;
- judging means for judging whether there is a bin to which a record sheet on which an image is formed can be discharged, or not, on the basis of a terminal apparatus identification data which is supplied from one of the connected terminal apparatuses and used for identifying the terminal apparatus, and outputs of the bin designating means and the record sheet number detecting means; and
- controlling means for controlling an operation of the discharging means so that, when the judging means judges that there is a bin to which a record sheet can be discharged, the record sheet is discharged to the bin, and, when the judging means judges that there is not a bin to which the record sheet can be discharged, the record sheet is discharged to a bin in accordance with the priority set by the priority setting means.

According to the invention, when there is a bin to which a record sheet on which an image is formed on the basis of image data supplied from a terminal apparatus can be discharged, the record sheet is discharged to the bin. Further when there is not a bin to which a record sheet can be discharged, the record sheet is discharged to a bin in accordance with the priority. When a bin is designated for a terminal apparatus and the bin has room for record sheets to be housed, it is judged that a record sheet can be discharged.

Therefore, even a record sheet due to a terminal apparatus for which no bin is designated can be discharged to a bin. Even when a designated bin is filled with already discharged record sheets, a record sheet can be discharged to another bin, so that record sheets can be efficiently discharged. As a result, bins can be efficiently used.

In the invention, the priority setting means sets a priority so that, when plural bins are designated for one terminal apparatus by the bin designating means, a record sheet that is judged to have no bin to which the record sheet can be discharged is inhibited from being discharged to at least one of the plural bins.

According to the invention, at least one of plural bins which are designated for one terminal apparatus is dedicated for the terminal apparatus, and only a record sheet due to the terminal apparatus is discharged to the bin. In the bin, therefore, record sheets due to the predetermined terminal apparatus can be separately collected without being mixed with record sheets due to other terminal apparatuses. As a result, it is possible to maintain high convenience.

Furthermore, the image forming apparatus of the invention comprises:

- image forming means for forming an image on a predetermined record sheet on the basis of image data supplied from one of connected terminal apparatuses;

discharging means for discharging the record sheet on which the image is formed;

bins which house the discharged record sheets;

bin designating means for designating a bin for each of the terminal apparatuses;

record sheet number detecting means for detecting a number of record sheets housed in each of the bins;

record sheet existence detecting means for detecting whether each of the bins houses a record sheet or not;

judging means for judging whether there is a bin to which the record sheet on which the image is formed can be discharged, or not, on the basis of a terminal apparatus identification data which is supplied from one of the connected terminal apparatuses and used for identifying the terminal apparatus, and outputs of the bin designating means and the record sheet number detecting means; and controlling means for controlling an operation of the discharging means so that, when the judging means judges that there is a bin to which the record sheet can be discharged, the record sheet is discharged to the bin, and, when the judging means judges that there is not a bin to which the record sheet can be discharged, a record sheet is discharged to a bin which is judged by the record sheet existence detecting means to house no record sheet.

According to the invention, when there is a bin to which a record sheet on which an image is formed on the basis of image data supplied from a terminal apparatus can be discharged, the record sheet is discharged to the bin, and, when there is not a bin to which the record sheet can be discharged, the record sheet is discharged to a bin in which no record sheet is housed.

Therefore, even a record sheet due to a terminal apparatus for which no bin is designated can be discharged to a bin. Even when a designated bin is filled with already discharged record sheets, a record sheet can be discharged to another bin, so that record sheets can be efficiently discharged. As a result, bins can be efficiently used. Moreover, record sheets due to a predetermined terminal apparatus can be separately collected without being mixed with record sheets due to other terminal apparatuses. As a result, it is possible to maintain high convenience.

In the invention, the controlling means controls the operation of the discharging means so that, when plural bins are designated for one terminal apparatus by the bin designating means, a record sheet that is judged to have no bin to which the record sheet can be discharged is inhibited from being discharged to at least one of the plural bins.

According to the invention, at least one of plural bins which are designated for one terminal apparatus is dedicated for the terminal apparatus, and only a record sheet due to the terminal apparatus is discharged to the bin. In the bin, therefore, record sheets due to the predetermined terminal apparatus can be separately collected without being mixed with record sheets due to other terminal apparatuses. As a result, it is possible to maintain higher convenience.

In the invention, the controlling means controls the operation of the discharging means so that, among record sheets which are judged to have no bin to which the record sheets can be discharged, only a record sheet on which an image is formed on the basis of image data supplied from a predetermined terminal apparatus is discharged to a predetermined bin.

According to the invention, among record sheets which are judged to have no bin to which the record sheets can be discharged, only a record sheet on which an image is formed on the basis of image data supplied from a predetermined terminal apparatus is discharged to a predetermined bin. Therefore, the bins are prevented from being used by many and unspecified terminal apparatuses, and order of designated bins can be maintained.

Preferably, the image forming apparatus further comprises record sheet discharge information outputting means for outputting information indicating that a record sheet that is judged to have no bin to which the record sheet can be discharged is discharged to a bin. Information is output which indicates that a record sheet that is judged to have no bin to which the record sheet can be discharged, i.e., a record sheet that is judged to be originated from a terminal apparatus for which no bin is designated, or a record sheet that is judged to have a designated bin which is filled with record sheets is discharged to a bin as described above. Consequently, the operator can carefully separately collect record sheets in accordance with the output of the information.

Preferably, the record sheet discharge information outputting means stops the output of the information when the record sheet discharged to the bin is removed from the bin. When the record sheet is removed from the bin, the information output is stopped. Consequently, the operator can collect record sheets without concern for the abovementioned discharge of the record sheet that is judged to have no bin to which the record sheet can be discharged.

Preferably, the record sheet discharge information outputting means is configured as displaying means. Information indicating that a record sheet that is judged to have no bin to which the record sheet can be discharged is discharged to a bin as described above is output by means of display. Consequently, the operator can visually recognize the display, and carefully separately collect record sheets. Preferably, when the record sheet discharged to the bin is removed from the bin, the display is canceled.

Furthermore, the image forming apparatus of the invention is an apparatus which comprises:

image forming means for forming an image on a predetermined record sheet on the basis of image data supplied from one of connected terminal apparatuses;

plural bins which house record sheets on which an image is formed;

bin designating means for designating a bin for each of the terminal apparatuses;

storing means for storing bins in correspondence with the terminal apparatuses, on the basis of designation of the bin designating means; and discharging means for, on the basis of contents stored in the storing means, discharging a record sheet on which an image is formed on the basis of image data supplied from a predetermined terminal apparatus, to a bin which is stored in correspondence with the predetermined terminal apparatus, the apparatus further comprising:

bin correspondence informing means for informing correspondence relationships between the bins and the terminal apparatuses; and controlling means for, when a bin which is stored by the storing means in correspondence with a terminal apparatus is designated for another terminal apparatus, controlling an operation of the bin correspondence informing means so as to inform that the bin is already designated, and rejecting storage into the storing means.

According to the invention, a record sheet on which an image is formed on the basis of image data supplied from a terminal apparatus is discharged to a designated bin. When a bin which is stored in correspondence with a terminal apparatus is designated for another terminal apparatus, it is informed that the bin is already designated, and storage by the storing means is rejected. Consequently, a bin different from one which is already designated is prevented from being designated, and convenience can be enhanced.

Furthermore, the image forming apparatus of the invention is an apparatus which comprises:

image forming means for forming an image on a predetermined record sheet on the basis of image data supplied from one of connected terminal apparatuses;

plural bins which house record sheets on which an image is formed;

bin designating means for designating a bin for each of the terminal apparatuses;

storing means for storing bins in correspondence with the terminal apparatuses, on the basis of designation of the bin designating means; and discharging means for, on the basis of contents stored in the storing means, discharging a record sheet on which an image is formed on the basis of image data supplied from a predetermined terminal apparatus, to a bin which is stored in correspondence with the predetermined terminal apparatus, and in which, only for a predetermined first period, a bin is designated for each of the terminal apparatuses by the bin designating means, and the storing means cancels storage contents due to the designation when the first period elapses.

According to the invention, a record sheet on which an image is formed on the basis of image data supplied from a terminal apparatus is discharged to a designated bin. A bin is designated for each of the terminal apparatuses, only for the first period which is a predetermined effective period. When the first period elapses, the storage contents due to the designation are erased. Therefore, a bin is prevented from being occupied by one terminal apparatus, and the bins can be effectively used by a larger number of terminal apparatuses.

In the invention, the storing means holds storage contents when the first period elapses and a record sheet is housed in a bin which is designated and stored.

According to the invention, since storage contents are held as described above, it is possible to know the terminal apparatus from which the record sheet housed in the bin is originated.

In the invention, the apparatus further comprises period setting means for setting a second period which is shorter than the first period, and the storing means cancels storage contents when the first period has not yet elapsed and a record sheet is not discharged during the second period to a bin which is designated and stored.

According to the invention, since storage contents are erased as described above, a bin is prevented from being occupied by one terminal apparatus, and the bins can be effectively used by a larger number of terminal apparatuses.

Preferably, the apparatus of the invention further comprises:

timer means for measuring a time; and warning means for, when a difference between a timing when the first period elapses and the time measured by the timer means is not longer than a predetermined period, warning that the first period is drawing to an end. Since the warning means warns that the first period is drawing to an end, the first period is prevented from expiring without attracting the notice of the operator. Therefore, convenience can be enhanced.

Preferably, a timing when the first period designated by the bin designating means starts coincides with a timing when a bin is designated for each of the terminal apparatuses by the bin designating means. Since the start timing of the first period is set as described above, a larger number of terminal apparatuses can be equally provided with an opportunity of using the bins.

Preferably, a timing when the first period designated by the bin designating means starts coincides with a timing when a record sheet is lastly discharged to a bin. Since the start timing of the first period is set as described above, a bin is prevented from being occupied by one terminal apparatus for a long term while no record sheet is discharged.

As described above, according to the invention, when there is a bin to which a record sheet on which an image is formed on the basis of image data supplied from a terminal apparatus can be discharged, the record sheet is discharged to the bin, and, when there is not a bin to which a record sheet can be discharged, the record sheet is discharged to a bin in accordance with the priority. Therefore, even a record sheet due to a terminal apparatus for which no bin is designated can be discharged to a bin. Even when a designated bin is filled with already discharged record sheets, a record sheet can be discharged to another bin, so that record sheets can be efficiently discharged. As a result, bins can be efficiently used.

According to the invention, at least one of plural bins which are designated for one terminal apparatus is dedicated for the terminal apparatus, and only a record sheet due to the terminal apparatus is discharged to the bin. In the bin, therefore, record sheets due to the predetermined terminal apparatus can be separately collected without being mixed with record sheets due to other terminal apparatuses. As a result, it is possible to maintain high convenience.

According to the invention, when there is a bin to which a record sheet can be discharged, the record sheet is discharged to the bin, and, when there is not a bin to which a record sheet can be discharged, the record sheet is discharged to a bin in which no record sheet is housed. Therefore, record sheets can be efficiently discharged and bins can be efficiently used. Moreover, record sheets due to a predetermined terminal apparatus can be separately collected without being mixed with record sheets due to other terminal apparatuses. As a result, it is possible to maintain high convenience.

According to the invention, at least one of plural bins which are designated for one terminal apparatus is dedicated for the terminal apparatus, and only a record sheet due to the terminal apparatus is discharged to the bin. In the bin, therefore, record sheets due to the predetermined terminal apparatus can be separately collected without being mixed with record sheets due to other terminal apparatuses. As a result, it is possible to maintain higher convenience.

According to the invention, among record sheets which are judged to have no bin to which the record sheets can be discharged, only a record sheet on which an image is formed on the basis of image data supplied from a predetermined terminal apparatus is discharged to a predetermined bin. Therefore, the bins are prevented from being used by many and unspecified terminal apparatuses, and order of designated bins can be maintained.

Preferably, information is output which indicates that a record sheet that is judged to be originated from a terminal apparatus for which no bin is designated, or a record sheet that is judged to have a designated bin which is filled with record sheets is discharged to a predetermined bin. According to this configuration, the operator can carefully separately collect record sheets in accordance with the output of the information.

Preferably, when the record sheet discharged to a bin is removed from the bin, the information output is stopped. According to this configuration, the operator can collect record sheets without concern for the discharge of the record sheet.

Preferably, the output is realized by means of display. According to this configuration, the operator can visually recognize the display, and carefully separately collect record sheets, without paying a attention to the discharge. More preferably, when the record sheet discharged to the bin is removed from the bin, the display is canceled.

According to the invention, when a bin which is stored in correspondence with a terminal apparatus is designated for another terminal apparatus, it is informed that the bin is already designated, and storage into the storing means is rejected. Consequently, a bin different from one which is already designated is prevented from being designated for another terminal apparatus, and convenience can be enhanced.

According to the invention, a bin is designated for each of the terminal apparatuses, only for the predetermined first period, and, when the first period elapses, the storage contents due to the designation are erased. Therefore, a bin is prevented from being occupied by one terminal apparatus, and the bins can be effectively used by a larger number of terminal apparatuses.

According to the invention, when the first period elapses and a record sheet is housed in a bin which is designated and stored, storage contents are held. Therefore, it is possible to know the terminal apparatus from which the record sheet housed in the bin is originated.

According to the invention, when the first period has not yet elapsed and a record sheet is not discharged during the second period to a bin which is designated and stored, storage contents are erased. Therefore, a bin is prevented from being occupied by one terminal apparatus, and the bins can be effectively used by a larger number of terminal apparatuses.

Preferably, the apparatus warns that the first period is drawing to an end. Therefore, the first period is prevented from expiring without attracting the notice of the operator, whereby convenience can be enhanced.

Preferably, a timing when the first period starts is set to coincide with that when a bin is designated for each of the terminal apparatuses. Therefore, a larger number of terminal apparatuses can be equally provided with an opportunity of using the bins.

Preferably, a timing when the first period starts is set to coincide with a timing when a record sheet is lastly discharged to a bin. Therefore, the bin is prevented from being occupied by one terminal apparatus for a long term while no record sheet is discharged.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
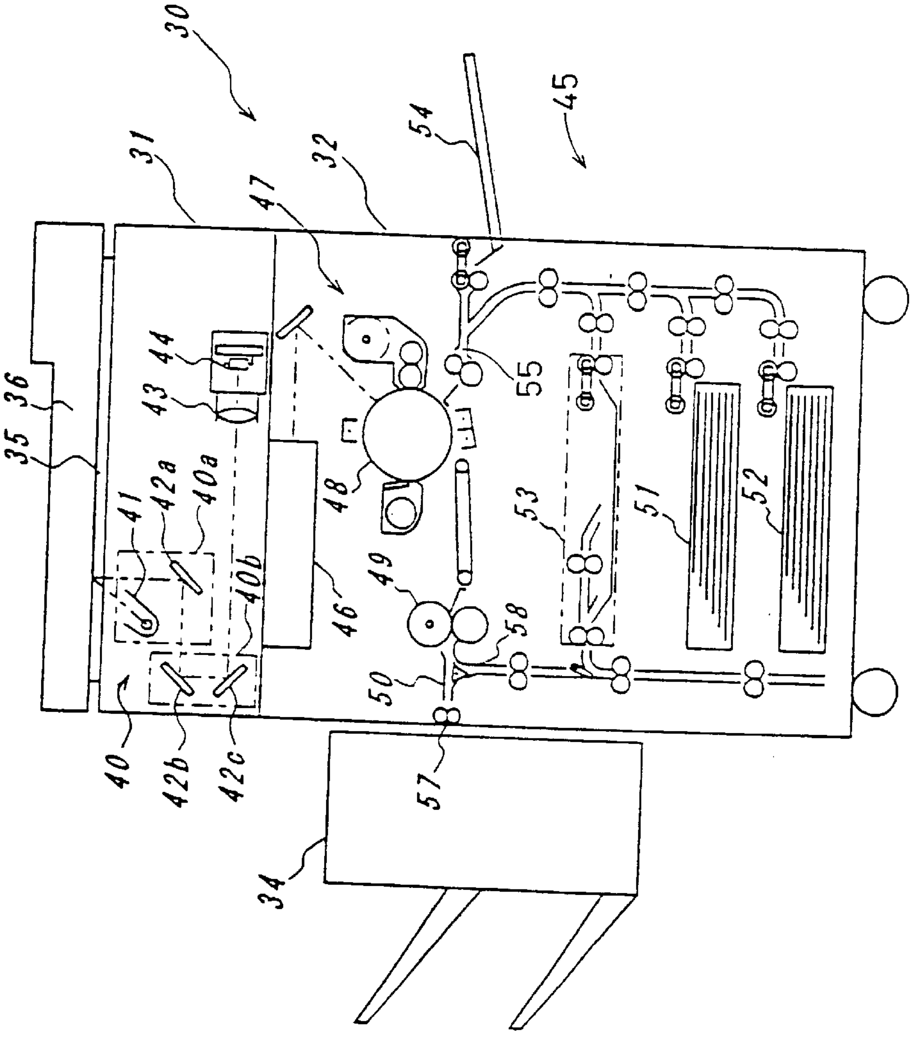
FIG. 1 is a side view showing the configuration of a digital copier 30 which is a mode of embodying the invention.

Now referring to the drawings, preferred embodiments of the invention are described below.

FIG. 1 is a side view showing the configuration of a digital copier 30 which is a mode of embodying the invention. The digital copier 30 is used in conjunction with terminal apparatuses such as host computers, and can perform an operation of copying an image of an original and also an image formation on the basis of image data supplied from one of the terminal apparatuses. Specifically, the copier is used in conjunction with personal computers, facsimile apparatuses, and the like serving as host computers, and can operate in either of a copy mode, a printer mode, and a facsimile mode. The digital copier 30 generally comprises a scanner section 31 and a record section 32.

The scanner section 31 is used in the copy mode and comprises an original table 35, a recycling automatic document feeder (RADF) 36, and a scanner unit 40. In the scanner section 31, in accordance with correlated operations of the automatic document feeder 36 and the scanner unit 40, originals on which an image to be read is drawn are sequentially placed on the original table 35, and each original is scanned by moving the scanner unit 40 along the lower face of the original table 35, thereby reading the image of the original.

The original table 35 comprises such as a transparent glass plate on which an original on which an image to be copied is drawn is placed. In the automatic document feeder 36, plural originals can be placed on a predetermined tray, and originals placed on the tray are automatically supplied one by one to the original table 35. In order to enable both a single-face copy in which originals are sequentially transported with directing only one face to the original table 35, and a double-face copy in which originals are sequentially transported with switchedly directing both faces to the original table 35, for example, the automatic document feeder 36 comprises original transport paths and path switches. The operator can select one of the two kinds of copies. The automatic document feeder 36 can be realized by a well-known technique.

The scanner unit 40 is an original image reading unit in order to scan and read an image of an original placed on the original table 35. The image of the original which is read by the scanner unit 40 is converted into image data. The image data is subjected to an image process which will be described later, stored, and then recorded. Specifically, the scanner unit 40 comprises a first scan unit 40*a*, a second scan unit 40*b*, an optical lens system 43, and a photoelectric converting element (CCD) 44. The first scan unit 40*a* comprises a lamp and reflector assembly 41 which exposes the original by irradiating it with light, and a first reflecting mirror 42*a* which guides a reflected light image obtained from the original as a result of the exposure to the photoelectric converting element 44. The second scan unit 40*b* comprises second and third reflecting mirrors 42*b* and 42*c* which guide the reflected light image from the first reflecting mirror 42*a* to the photoelectric converting element 44. The optical lens system 43 forms the reflected light image from the third reflecting mirror 42*c* on the photoelectric converting element 44 so that the photoelectric converting element 44 converts the reflected light image from the original into image data in the form of an electric image signal.

The record section 32 is used in all of the copy mode, the printer mode, and the facsimile mode. The record section 32 forms an image with using a laser beam or the like, and comprises a record sheet housing and transporting section 45, a laser writing unit 46, and an electrophotographic process section 47.

The record sheet housing and transporting section 45 comprises a first cassette 51, a second cassette 52, a double-face copy unit 53, and a multiple manual feed tray 54. The first and second cassettes 51 and 52 house record sheets of predetermined kinds, for example, those of different sizes. The double-face copy unit 53 houses record sheets in each of which an image is already formed on one face, in order to form an image on the other face. The operator manually supplies record sheets to the multiple manual feed tray 54. When an image is to be formed, one of the first cassette 51, the second cassette 52, the double-face copy unit 53, and the multiple manual feed tray 54 is selected, and record sheets housed in the selected one are supplied one by one to the electrophotographic process section 47 via a transport path 55.

The laser writing unit 46 comprises: a laser light source which emits a laser beam in accordance with image data and which is realized by a semiconductor device and the like; a polygon mirror which deflects the laser beam at a constant angular velocity; and an f-θ lens which corrects the laser beam deflected at a constant angular velocity so as to be deflected at a constant velocity on a photoreceptor drum of the electrophotographic process section 47 which will be described later.

The electrophotographic process section 47 is realized by a well-known technique. At least a charger, a developer, a transfer device, a separator, a cleaner, and a discharger are arranged around the photoreceptor drum 48. In the record sheet transport path in the electrophotographic process section 47, a fixing device 49 is disposed in the downstream end in the transport direction. On the downstream side of the fixing device 49 in the transport direction, a record sheet discharge transport path 50 is disposed, which branches into a transport path 57 leading to a post-process section 34 which will be described later, and a transport path 58 leading to the above-described double-face copy unit 53.

When the laser writing unit 46 performs a laser beam scanning operation, image data is formed into an electrostatic latent image on the surface of the photoreceptor drum 48 which is previously charged by the charger. Toner supplied to the developer is attracted to the electrostatic latent image by the electric suction force, thereby forming a toner image. A record sheet supplied from the record sheet housing and transporting section 45 is placed on the toner image, and the toner image is transferred to the record sheet by the transfer device and the separator. Toner remaining on the surface of the photoreceptor drum 48 is removed away by the cleaner, and the residual potential is discharged by the discharger. The record sheet to which the toner image is transferred is then subjected to a fixing process by the fixing device 49. The record sheet on which an image is formed in this way is selectively transported to the post-process section 34 via the transport paths 50 and 57, or to the double-face copy unit 53 via the transport paths 50 and 58.

Figure 2:
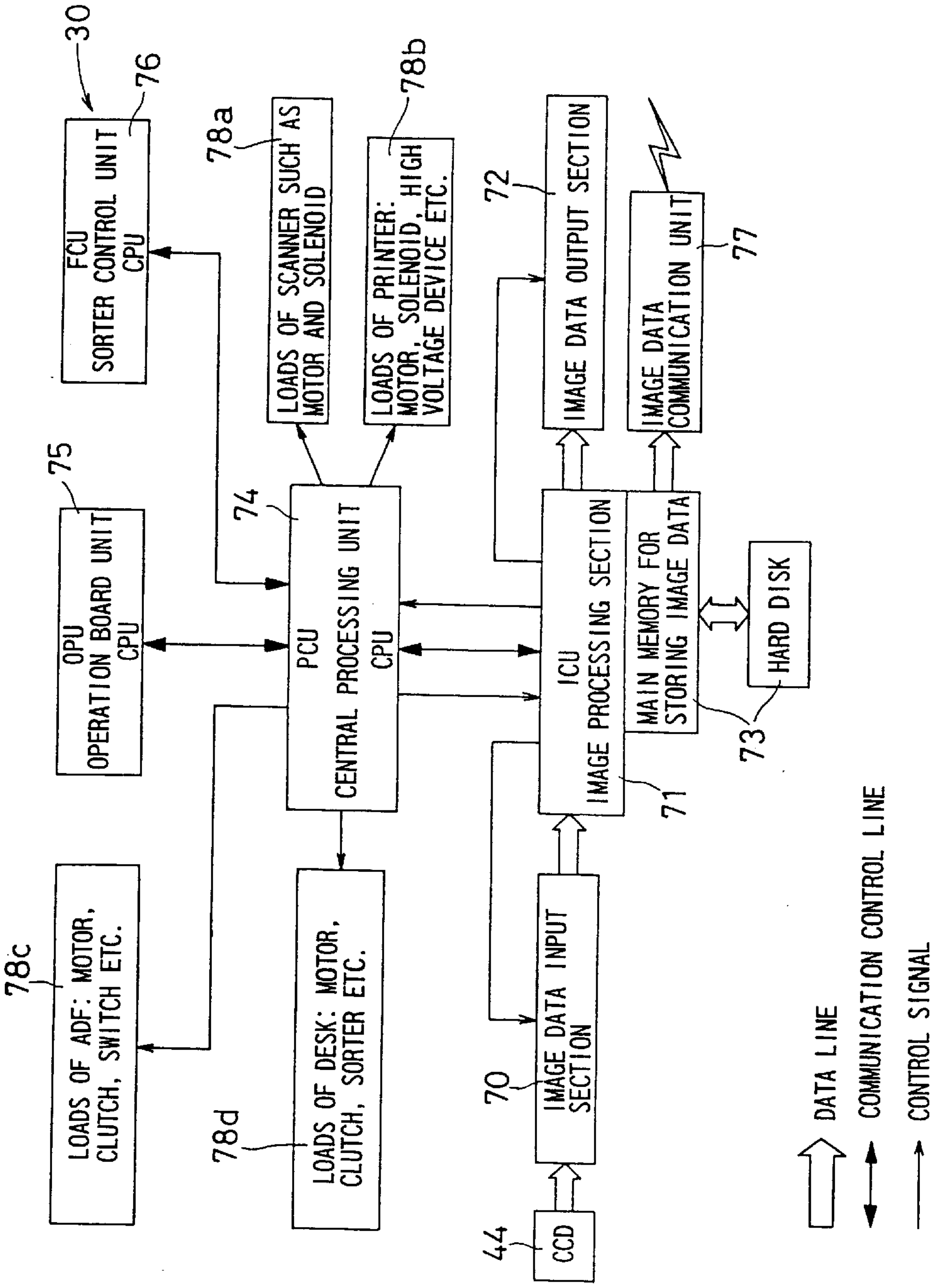
FIG. 2 is a block diagram showing the configuration of the digital copier 30.

FIG. 2 is a block diagram showing the configuration of the digital copier 30. The digital copier 30 comprises image data input section 70, an image processing section 71, image data output section 72, a memory 73, a CPU (Central Processing Unit) 74, an operation board unit 75, a sorter control unit 76, image data communication unit 77, and drive units 78*a* to 78*d*.

The image data input section 70 binarizes the image data read from the photoelectric converting element 44, and processes the data by an error diffusion method while constructing a histogram of the data in the form of a binary digital value. The processed data are temporarily stored in the memory 73.

The image processing section 71 finally converts the input image data into image data of a form which is desired by the operator, and supplies the converted data to the memory 73. The input image data remain to be processed in the image processing section 71 until image data of a form desired by the operator is obtained.

The image data output section 72 restores the image data which is stored in the memory 73 in a compressed state, and converts again the reconstructed data into a data of 256 levels. Then, error diffusion of binary data for four-level data consisting of smooth half-tone representation is conducted and the resulting data is output.

The CPU 74 controls and manages the sequences of the components of the digital copier 30, such as the document feeder 36, the scanner section 31, and the record section 32, and outputs control signals to the components.

The operation board unit 75 is connected to the CPU 74 so that the communication between the two units is enabled. The operator sets and inputs various data through the operation board unit 75. When the CPU 74 receives a control signal due to the input operation, the CPU 74 controls the operations of the components in accordance with the control signal. The CPU 74 supplies a control signal indicative of the operation state of the digital copier 30 to the operation board unit 75. When the operation board unit 75 receives the control signal, the state of the digital copier 30 is displayed on, for example, a display device of the unit 75 so that the operator is informed of the state.

The sorter control unit 76 controls and manages the operation of the post-process section 34 which sorts record sheets discharged from the digital copier 30.

The image data communication unit 77 transmits and receives image data and image control signal from another communication apparatus. The drive units 78*a* to 78*d* control and drive loads relating to the scanner, the printer, the RADF, and the desk.

Figure 3:
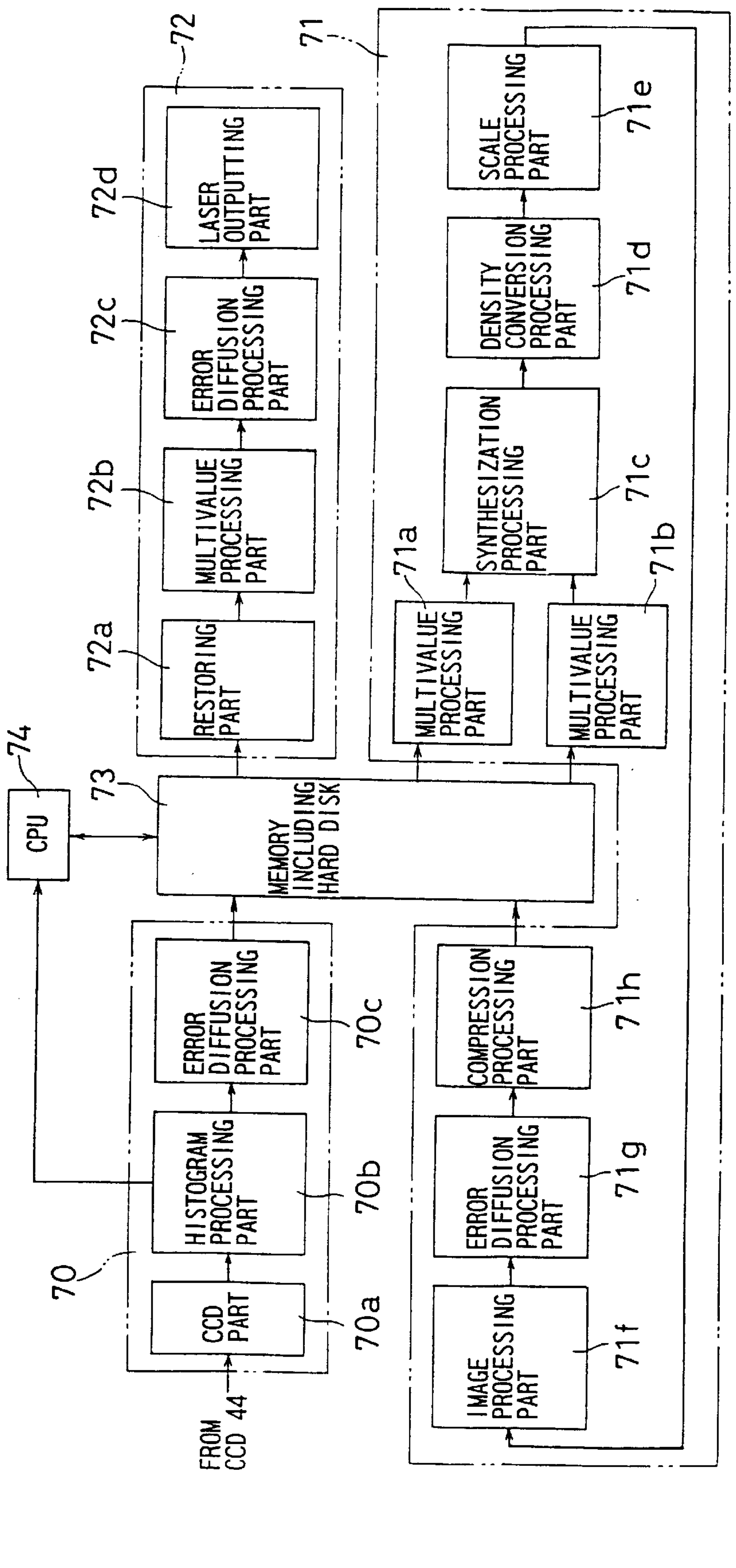
FIG. 3 is a block diagram showing in detail the configuration of an image data input section 70, an image processing section 71, and an image data output section 72.

FIG. 3 is a block diagram showing in detail the configuration of the image data input section 70, the image processing section 71, and the image data output section 72. The digital copier 30 applies an image process on the image data which has been read by the scanner unit 40 and then converted, by using the image data input section 70, the image processing section 71, and the image data output section 72.

The image data input section 70 comprises a CCD part 70*a*, a histogram processing part 70*b*, and an error diffusion processing part 70*c*. In the CCD part 70*a*, analog signals respectively corresponding to pixel densities of the image data are A/D (analog/digital) converted, and then subjected to, for example, the MTF correction, the white and black correction, or the gamma correction. The resulting signals are supplied as digital signals of 256 levels (8 bits) to the histogram processing part 70*b*.

In the histogram processing part 70*b*, the digital signals supplied from the CCD part 70*a* are accumulated for each of pixel densities of 256 levels, so as to obtain histogram data serving as density information. As required, the histogram data are supplied to the CPU 74, and as image data to the error diffusion processing part 70*c*.

In the error diffusion processing part 70*c*, each digital signal of 8 bits/pixel outputted from the CCD part 70*a* is converted into a 1-bit signal (binarized data) by the error diffusion method which is a kind of pseudo intermediate process, i.e., a method in which an error of a binarizing process is reflected to judgement on binarization of adjacent pixels. A redistribution calculation is conducted in order to faithfully reproduce the density of each local area of the original.

The image processing section 71 comprises multivalue processing parts 71*a* and 71*b*, a synthesization processing part 71*c*, a density conversion processing part 71*d*, a scale processing part 71*e*, an image processing part 71*f*, an error diffusion processing part 71*g*, and a compression processing part 71*h*. The processing parts 71*a* to 71*h* are caused to operate as required. In the multivalue processing parts 71*a* and 71*b*, the data which has been binarized in the error diffusion processing part 70*c* is converted so as to be returned to data of 256 levels.

The synthesization processing part 71*c* selectively conducts logical calculation processes for each pixel, i.e., calculation processes of disjunction, conjunction, and exclusive disjunction. The data which is to be subjected to the calculation is the image data stored in the memory 73 and bit data supplied from a pattern generator (PG).

In the density conversion processing part 71*d*, relationships between the input density and the output density are set on the 256-level data signal on the basis of a predetermined gray scale conversion table. In accordance with a designated scaling factor, the scale processing part 71*e* performs an interpolation process based on input known data, thereby obtaining image data (density value) for the image to be processed which has undergone the scaling process. After the scale in the sub scanning direction is modified, the scaling process is performed on the scale in the main scanning direction.

The image processing part 71*f* performs various image processes on the input image data, and can conduct information collection on a data string such as feature extraction. The error diffusion processing part 71*g* performs processes which are similar to those of the error diffusion processing part 70*c* of the image data input section 70. In the compression processing part 71*h*, the binary data is compressed by a coding process such as a process which is called run-length. With respect to the compression of the image data, the compression processing part 71*h* operates in the loop of the final process at the timing when a final output image is completed.

The image data output section 72 comprises a restoring part 72*a*, a multivalue processing part 72*b*, an error diffusion processing part 72*c*, and a laser outputting part 72*d*. The restoring part 72*a* restores the image data which has been compressed by the compression processing part 71*h*. The multivalue processing part 72*b* performs processes which are similar to those of the multivalue processing parts 71*a* and 71*b* of the image data input section 70.

The error diffusion processing part 72*c* performs processes which are similar to those of the error diffusion processing part 70*c* of the image data input section 70. In the laser outputting part 72*d*, the digital image data is converted into on/off signals for the laser device on the basis of a control signal supplied from a sequence controller which is not shown, so as to turn on/off the semiconductor laser device of the laser writing unit 46, whereby an electrostatic latent image is drawn on the photoreceptor drum 48.

Basically, the data which is to be handled in the image data input section 70 and the image data output section 72 is stored in the memory 73 in the form of binary data, in order to reduce the capacity of the memory 73. Alternatively, the image data may be processed in the form of four-level data in consideration of degradation of the image data.

Figure 4:
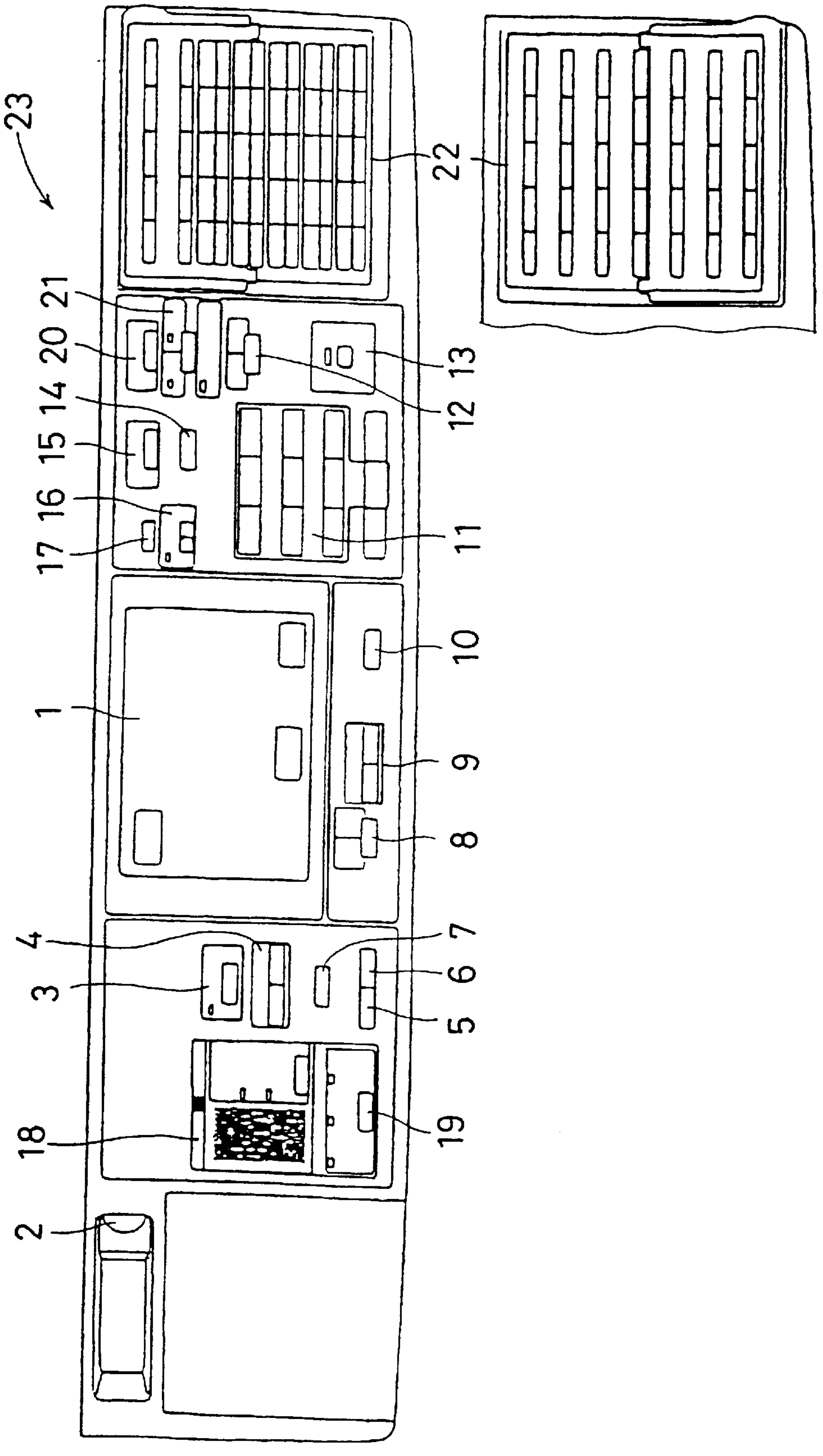
FIG. 4 is a plan view showing an operation panel 23 disposed in an operation board unit 75.

FIG. 4 is a plan view showing an operation panel 23 of the operation board unit 75. The operation panel 23 comprises a display section 1, a brightness adjust dial 2, and plural keys 3 to 22. The display section 1 is realized by, for example, a liquid crystal display device, and placed in a substantially center area. The brightness adjust dial 2 through which the brightness of the screen of the display section 1 is adjusted, and the keys 3 to 22 with which every kind of data is input are arranged around the periphery of the display section 1.

An input device which is realized by, for example, a touch panel is stacked on the display section 1. A predetermined instruction area is always displayed on the display screen of the display section 1. When the input face of the touch panel corresponding to the instruction area is directly pressed, the display is switched to an image editing function selection screen in which various editing functions are listed. When the operator selects a desired editing function by directly pressing the image editing function selection screen in the same manner as described above, the selected function is executed.

When the automatic magnification setting key 3 of the keys 3 to 22 is pressed, an execution of a mode of automatically setting the magnification factor for the copy operation is instructed. When the zoom key 4 is pressed, the copy magnification factor is set in increments of 1%. When the fixed magnification factor key 5 or 6 is pressed, a corresponding fixed magnification factor is read out and then set.

When the nonmagnification key 7 is pressed, the copy magnification factor is set to nonmagnification (standard magnification factor).

When the density switch key 8 is pressed, the density adjust method is switched to either of an automatic mode, a manual mode, and a photograph mode. When the density adjust key 9 is pressed, the density level is finely set in the manual mode or the photograph mode.

When the tray selection key 10 is pressed, one of the plural trays of the digital copier 30 is selected, whereby the kind of the record sheet is selected.

The number of copy sheets can be set through the number setting key 11. When the clear key 12 is pressed, it is instructed to cancel the preset copy sheet number or intercept a continuous copy operation. When the start key 13 is pressed, it is instructed to start a copy operation. When the all clear key 14 is pressed, it is instructed to cancel all modes which are currently set and return the operation mode to a predetermined standard state. When the interruption key 15 is pressed, it is instructed to copy another original during a continuous copy operation.

The operation guide key 16 is used when the operator is having trouble operating the digital copier 30. When the key 16 is pressed, a message instructing the manner of operating the copier 30 is displayed on the display section 1. When the displayed message is to be continued, the forward key 17 is pressed to forward advance the message.

When the double-face set key 18 is pressed, a double-face copy mode is set. When the post-process mode set key 19 is pressed, the operation mode of the post-process section 34 for assorting record sheets discharged from the digital copier 30 is set.

The keys 20 to 22 are used in the printer mode and the facsimile mode. When the memory transmission function key 20 is pressed, a mode in which image data to be transmitted is once stored in a memory and then transmitted is designated. When the mode switch key 21 is pressed, it is instructed to switch over the mode of the digital copier 30 so as to be either of the copy mode, and the printer, and facsimile modes. The plural one-touch dial keys 22 previously store respective telephone numbers, so that a calling operation is executed by a one-touch operation.

Figure 5:
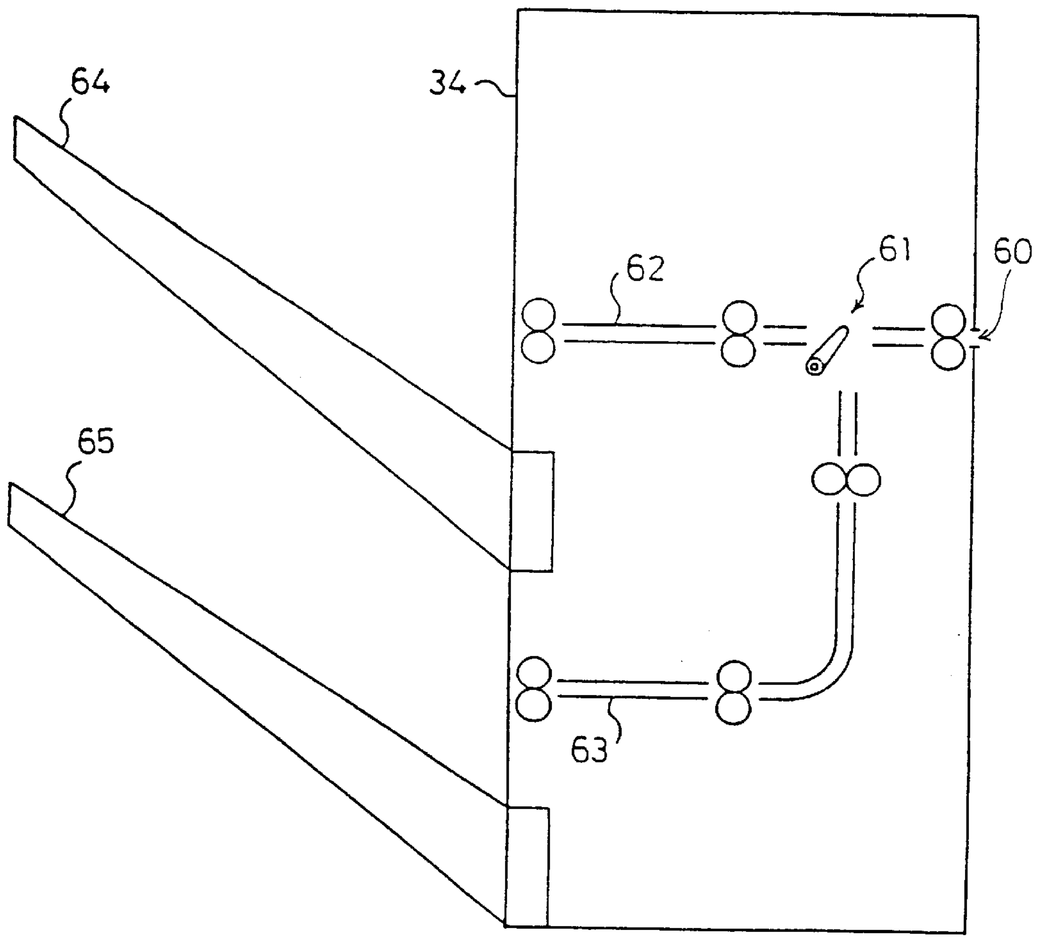
FIG. 5 is a side view showing an example of the configuration of a post-process section 34.

Next, the operation of the post-process section 34 will be described. FIG. 5 is a side view showing an example of the configuration of the post-process section 34. The post-process section 34 comprises plural (in the example, two) bins 64 and 65. A record sheet supplied through a record sheet receiving port 60 is caused by transport direction switch 61 to be transported to either of a first path 62 and a second path 63. The record sheet is discharged to the first bin 64 via the first path 62, and to the second bin 65 via the second path 63.

Figure 6:
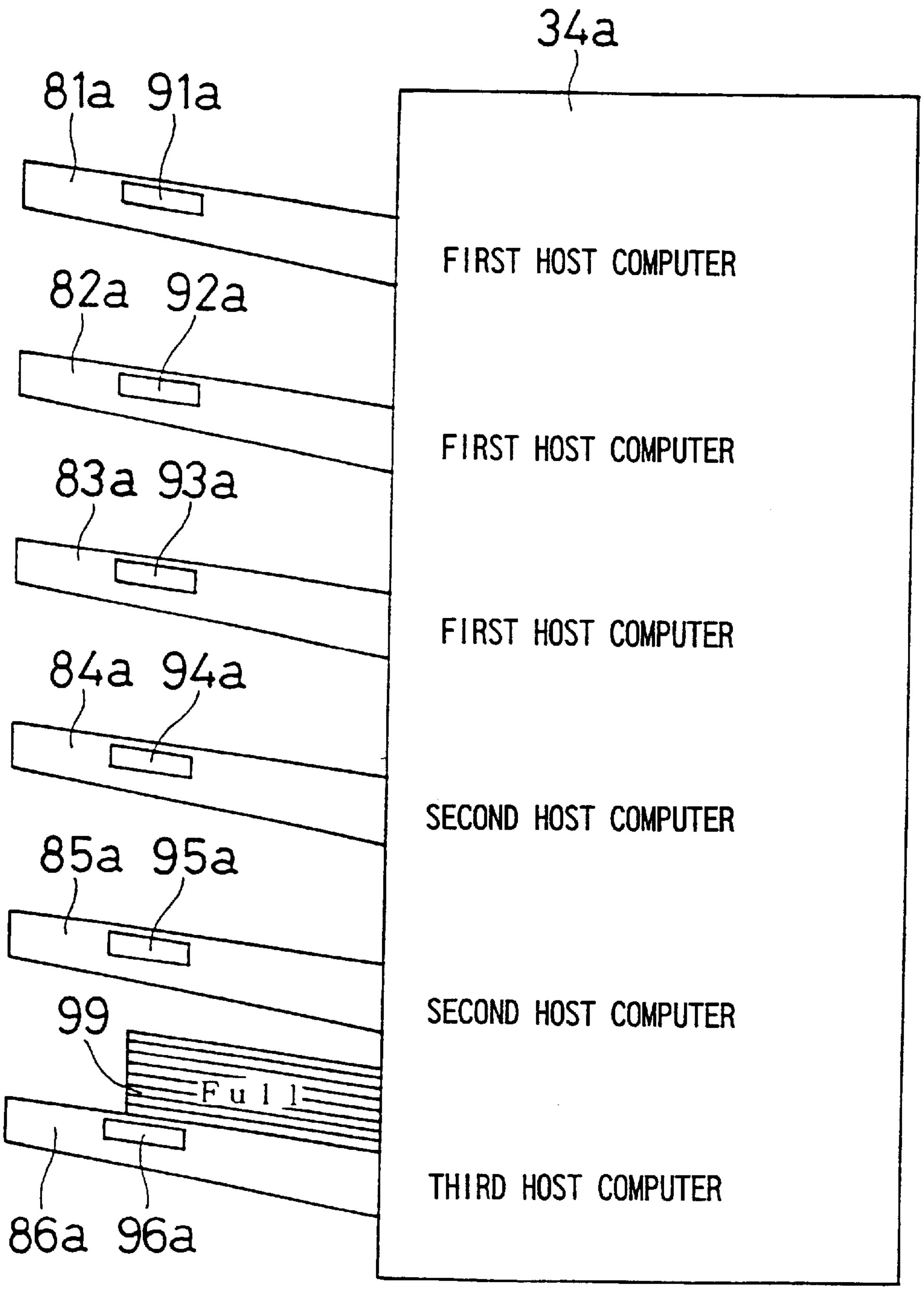
FIG. 6 is a side view showing a post-process section 34*a* which is a first embodiment of the invention.

FIG. 6 is a side view showing a post-process section 34*a*which is a first embodiment of the invention. In the embodiment, the digital copier 30 is used with being connected to at least first to third host computers. Each of the connected host computers transmits identification data for identifying the host computer, in addition to image data.

The post-process section 34*a* of the embodiment comprises first to sixth bins 81*a*, 82*a*, 83*a*, 84*a*, 85*a*, and 86*a*. The first to third bins 81*a*, 82*a*, and 83*a* are set so as to correspond to the first host computer. A record sheet on which an image is drawn on the basis of image data supplied from the first host computer is discharged to one of the first to third bins 81*a*, 82*a*, and 83*a*. The fourth and fifth bins 84*a* and 85*a* are set so as to correspond to the second host computer. A record sheet on which an image is drawn on the basis of image data supplied from the second host computer is discharged to one of the fourth and fifth bins 84*a* and 85*a*. The sixth bins 86*a* is set so as to correspond to the third host computer. A record sheet on which an image is drawn on the basis of image data supplied from the third host computer is discharged to the sixth bin 86*a*.

To each of the bins, a priority of discharging to the bin a record sheet which is to be discharged to another bin can be assigned. Among the first to third bins 81*a*, 82*a*, and 83*a*, a first priority is assigned to the second and third bin 82*a* and 83*a*, so that the bins house not only record sheets on which an image due to the first host computer is drawn, but also those on which an image due to any other one of the host computers is drawn. The first bin 81*a* houses only record sheets on which an image due to the first host computer is drawn. Among the fourth and fifth bins 84*a* and 85*a*, a first priority is assigned to the fifth bin 85*a*, so that the bin houses not only record sheets on which an image due to the second host computer is drawn, but also those on which an image due to any other one of the host computers is drawn. The fourth bin 84*a* houses only record sheets on which an image due to the second host computer is drawn.

The embodiment is configured so that, for each of the bins 81*a*, 82*a*, 83*a*, 84*a*, 85*a*, and 86*a*, the number of record sheets housed in the bin can be detected.

For example, a record sheet 99 on which an image due to the third host computer is drawn is usually housed in the sixth bin 86*a*. If it is judged that the sixth bin 86*a* is full, the record sheet is discharged to one of bins which are not the sixth bin 86*a* and which are not the first and fourth bins 81*a* and 84*a* respectively dedicated to the first and second host computers, i.e., one of the second, third, and fifth bins 82*a*, 83*a*, and 85*a*.

Figure 7:
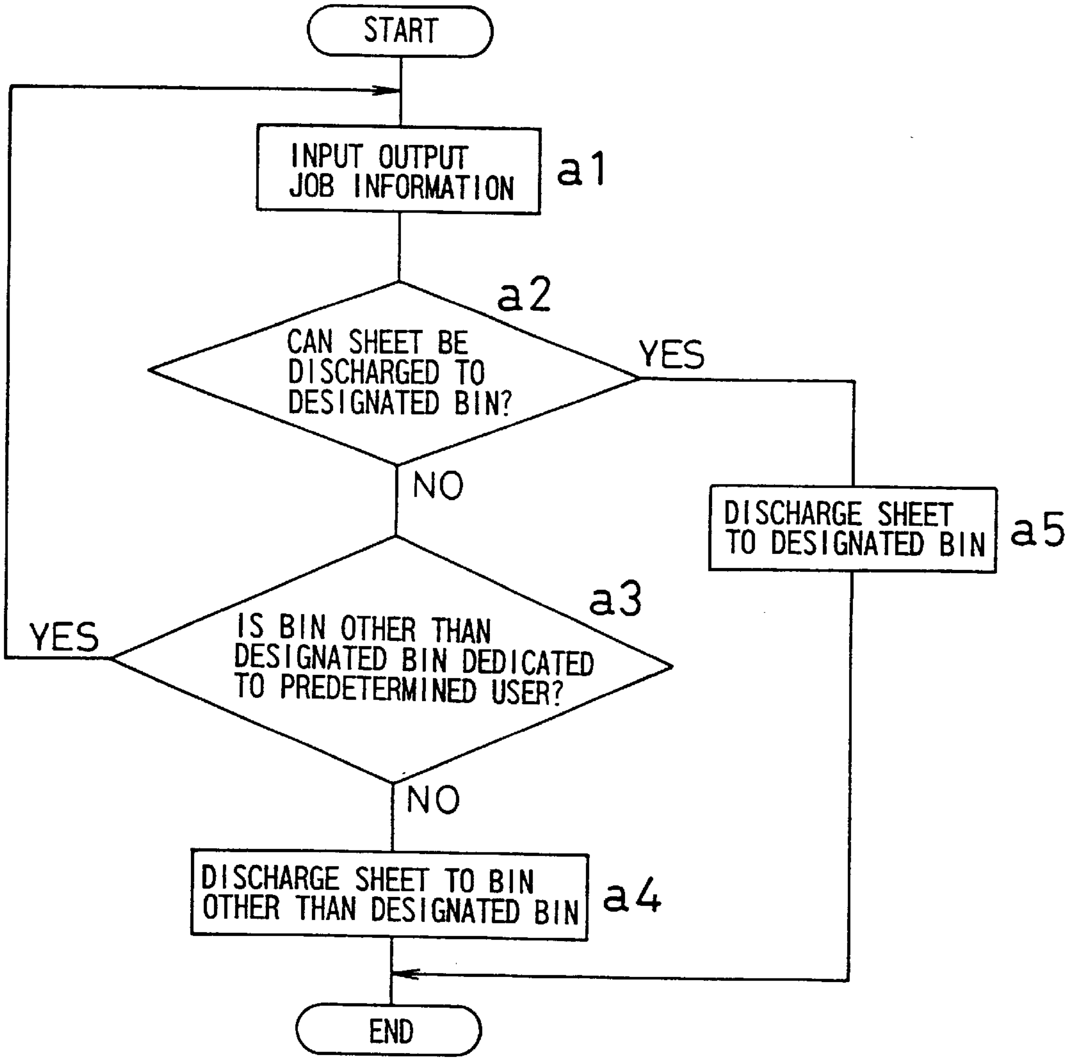
FIG. 7 is a flowchart showing a record sheet discharging operation of a digital image forming apparatus having the post-process section 34*a;*

FIG. 7 is a flowchart showing a record sheet discharging operation of a digital image forming apparatus having the post-process section 34*a*. In step a1, output JOB information is inputted from a host computer connected to the apparatus. The output JOB information includes the number of record sheets and that of copy sets, in addition to the image data and the identification data. In step a2, a designated bin which is set so as to correspond to the host computer is detected on the basis of the identification data, and it is judged whether a record sheet can be discharged to the designated bin or not. Specifically, the capacity of the bin is obtained. If it is judged that there is room in the capacity and a further record sheet can be discharged to the bin, the control proceeds to step a5 to discharge a record sheet to the designated bin. If it is judged that the designated bin is full and no further record sheet can be discharged to the bin, the control proceeds to step a3.

In step a3, it is judged whether a bin other than the designated bin is set to be dedicated to a predetermined host computer or not. If it is judged that the bin is a dedicated one, the control returns to step a1 without discharging a record sheet. If it is judged that the bin is not a dedicated one, a record sheet is discharged in step a4 to a bin other than the designated bin.

According to the first embodiment, when there is a bin to which a record sheet on which an image is formed on the basis of image data supplied from a host computer can be discharged, the record sheet is discharged to the bin, and, when there is not a bin to which the record sheet can be discharged, the record sheet is discharged to a bin in accordance with the priority. When there is a bin designated for the computer and there is room in the number of record sheets which can be housed in the bin, it is judged that the record sheet can be discharged.

When there is room with respect to the capacity, therefore, even a record sheet due to a computer for which no bin is designated can be discharged to a bin. Even when a designated bin is filled with already discharged record sheets, a record sheet can be discharged to another bin, so that record sheets can be efficiently discharged. As a result, the bins can be efficiently used.

Furthermore, at least one of plural bins which are designated for one host computer is dedicated for the computer, and only a record sheet due to the computer is discharged to the bin. In the bin, therefore, record sheets due to the predetermined computer can be separately collected without being mixed with record sheets due to other computers. As a result, it is possible to maintain high convenience.

Figure 8:
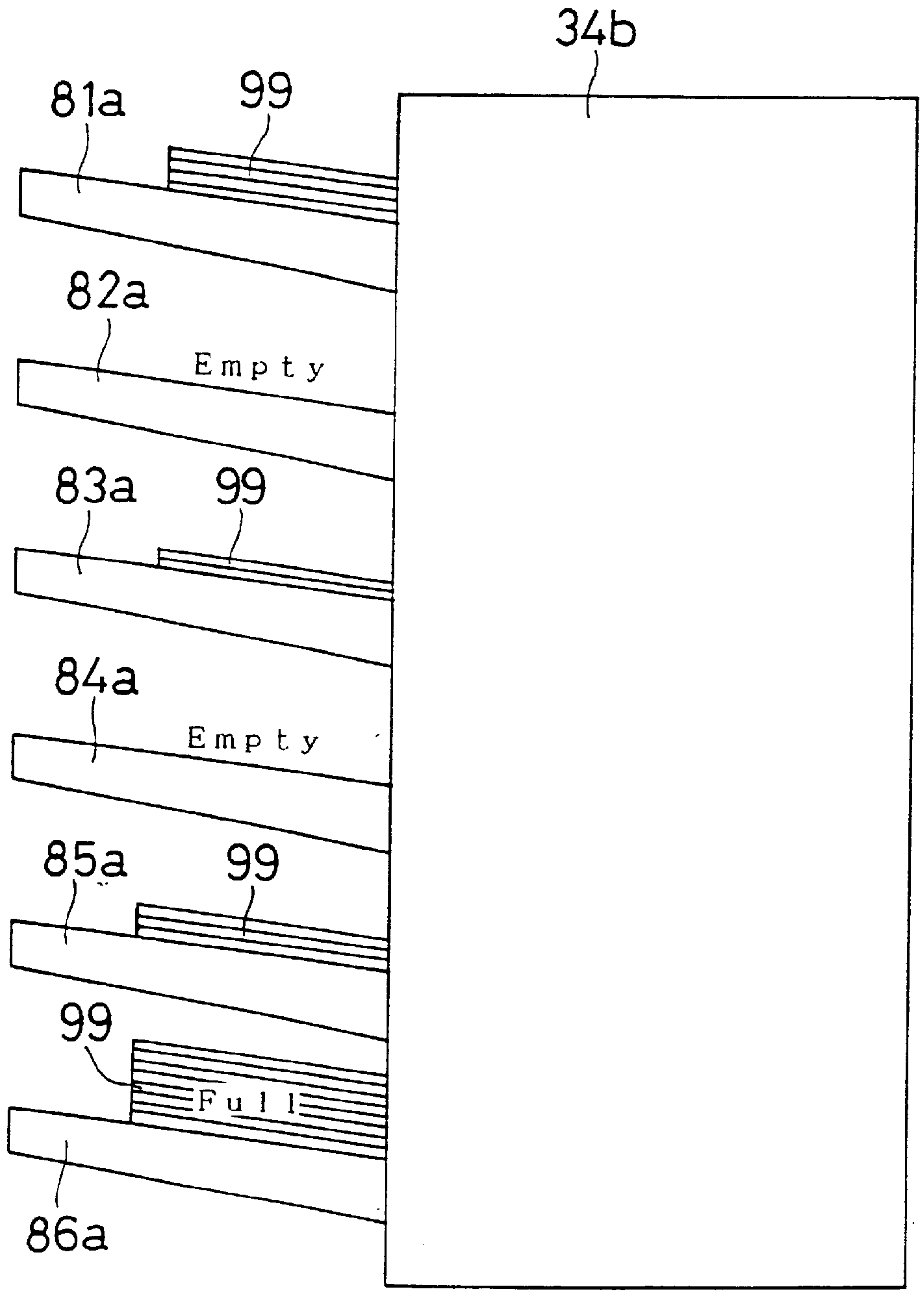
FIG. 8 is a side view showing a post-process section 34*b* which is a second embodiment of the invention.

FIG. 8 is a side view showing a post-process section 34*b* which is a second embodiment of the invention. In the embodiment, in the same manner as the first embodiment, the digital copier 30 is used with being connected to at least first to third host computers. The post-process section 34*b* of the embodiment comprises first to sixth bins 81*a*, 82*a*, 83*a*, 84*a*, 85*a*, and 86*a* which are set so as to correspond to the host computers in the same manner as the first embodiment. Furthermore, in the same manner as the first embodiment, the embodiment is configured so that, for each of the bins 81*a*, 82*a*, 83*a*, 84*a*, 85*a*, and 86*a*, the number of record sheets housed in the bin can be detected.

To each of the bins, a priority of discharging to the bin a record sheet which is to be discharged to another bin can be assigned. In the embodiment, a first priority is assigned to a bin in which no record sheet is housed, so that the bin houses not only record sheets on which an image due to the host computer corresponding to the bin is formed, but also those on which an image due to any other one of the host computers is drawn. In the example of FIG. 8, the first priority is assigned to the second and fourth bins 82*a* and 84*a*. Each of the other bins or the first, third, fifth, and sixth bins 81*a*, 83*a*, 85*a*, and 86*a* houses only record sheets on which an image due to the host computer corresponding to the bin is drawn.

For example, a record sheet 99 on which an image due to the third host computer is drawn is usually housed in the sixth bin 86*a*. If it is judged that the sixth bin 86*a* is full, the record sheet is discharged to one of bins which are not the sixth bin 86*a* and which are not the first, third, and fifth bins 81*a*, 83*a*, and 85*a* which already house record sheets, i.e., one of the second and fourth bins 82*a* and 84*a*.

Figure 9:
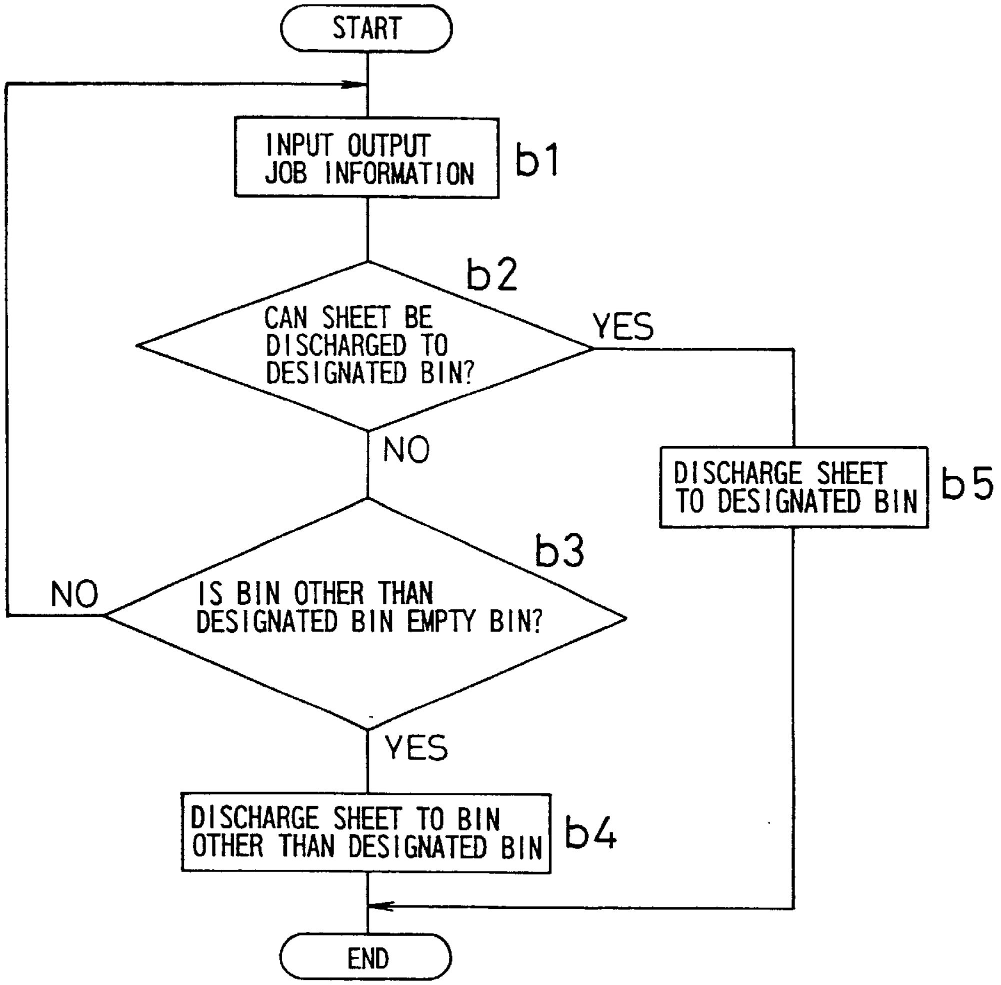
FIG. 9 is a flowchart showing a record sheet discharging operation of a digital image forming apparatus having the post-process section 34*b;*

FIG. 9 is a flowchart showing a record sheet discharging operation of a digital image forming apparatus having the post-process section 34*b*. In step b1, output JOB information is inputted from a host computer connected to the apparatus. The output JOB information includes the number of record sheets and that of copy sets, in addition to the image data and the identification data. In step b2, a designated bin which is set so as to correspond to the host computer is detected on the basis of the identification data, and it is judged whether a record sheet can be discharged to the designated bin or not. The capacity of the bin is obtained. If it is judged that there is room with respect to the capacity and a further record sheet can be discharged to the bin, the control proceeds to step b5 to discharge a record sheet to the designated bin. If it is judged that the designated bin is full and no further record sheet can be discharged to the bin, the control proceeds to step b3.

In step b3, it is judged whether a bin other than the designated bin is an empty bin which houses no record sheet or not. If it is judged that the bin is not an empty bin, the control returns to step b1 without discharging a record sheet. If it is judged that the bin is an empty bin, a record sheet is discharged in step b4 to an empty bin other than the designated bin.

According to the second embodiment, when there is a bin to which a record sheet on which an image is formed on the basis of image data supplied from a host computer can be discharged, the record sheet is discharged to the bin, and, when there is not a bin to which the record sheet can be discharged, the record sheet is discharged to a bin in which no record sheet is housed.

Therefore, even a record sheet due to a computer for which no bin is designated can be discharged to a bin when there is room with respect to the capacity of the bin. Even when a designated bin is filled with already discharged record sheets, a record sheet can be discharged to another bin, so that record sheets can be efficiently discharged. As a result, bins can be efficiently used. Moreover, record sheets due to a predetermined computer can be separately collected without being mixed with record sheets due to other computers. As a result, it is possible to maintain high convenience.

At least one of plural bins which are designated for one computer is dedicated for the computer, and only a record sheet due to the computer is discharged to the bin. In the bin, therefore, record sheets due to the predetermined computer can be separately collected without being mixed with record sheets due to other computers. As a result, it is possible to maintain higher convenience.

Figure 10:
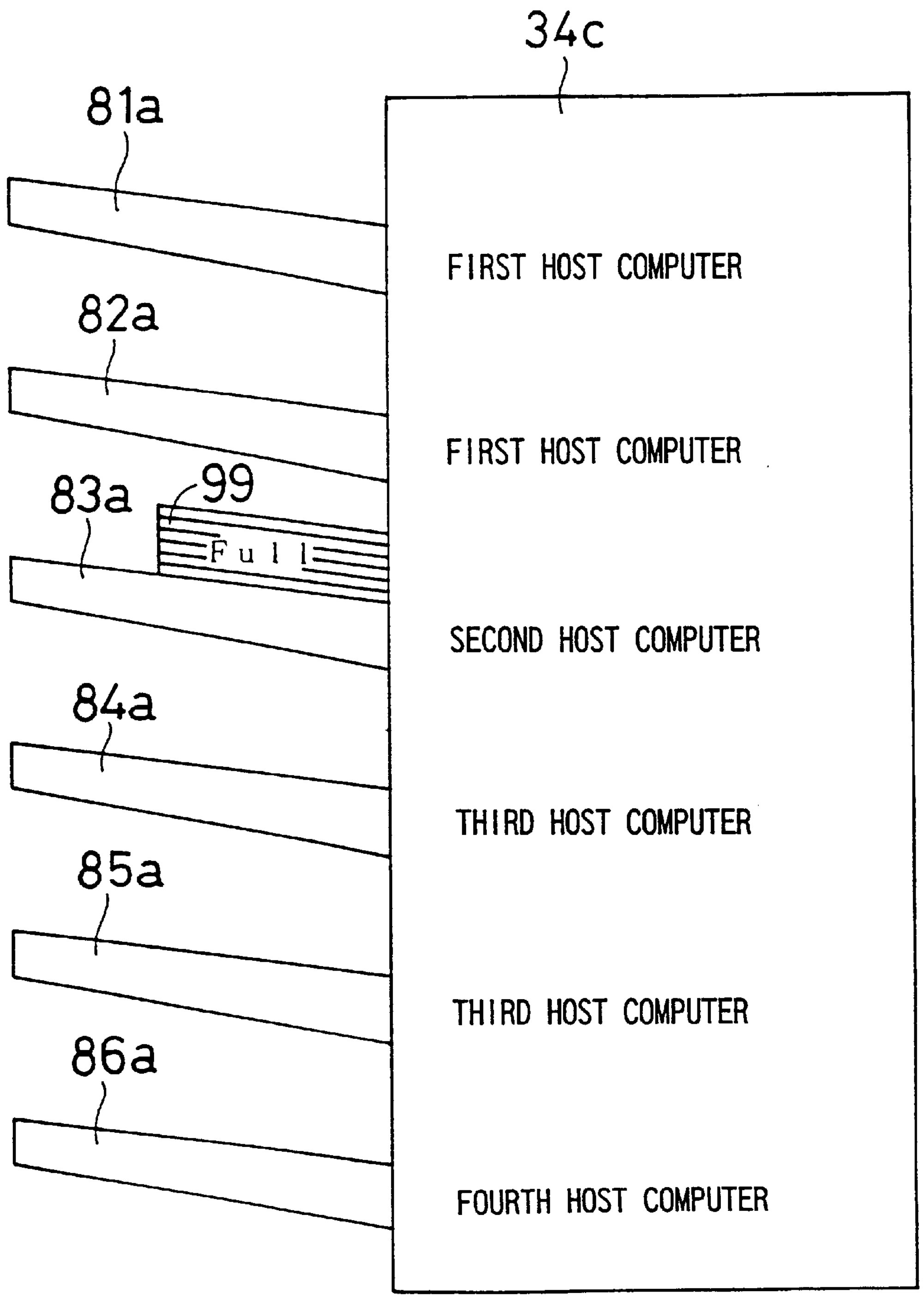
FIG. 10 is a side view showing a post-process section 34*c* which is a third embodiment of the invention.

FIG. 10 is a side view showing a post-process section 34*c* which is a third embodiment of the invention. In the embodiment, the digital copier 30 is used with being connected to at least first to fourth host computers. Each of the connected host computers transmits identification data for identifying the host computer, in addition to image data. The post-process section 34*c* of the embodiment comprises first to sixth bins 81*a*, 82*a*, 83*a*, 84*a*, 85*a*, and 86*a*. The first and second bins 81*a* and 82*a* are set so as to correspond to the first host computer. A record sheet on which an image is drawn on the basis of image data supplied from the first host computer is discharged to one of the first and second bins 81*a* and 82*a*. The third bin 83*a* is set so as to correspond to the second host computer. A record sheet on which an image is drawn on the basis of image data supplied from the second host computer is discharged to the third bin 83*a*. The fourth and fifth bins 84*a* and 85*a* are set so as to correspond to the third host computer. A record sheet on which an image is drawn on the basis of image data supplied from the third host computer is discharged to one of the fourth and fifth bins 84*a* and 85*a*. The sixth bins 86*a* is set so as to correspond to the fourth host computer. A record sheet on which an image is drawn on the basis of image data supplied from the fourth host computer is discharged to the sixth bin 86*a*.

To each of the bins, a priority of discharging to the bin a record sheet which is to be discharged to another bin can be assigned. The first and second bins 81*a* and 82*a* are set so as to house not only record sheets on which an image due to the first host computer is drawn, but also those on which an image due to the second host computer is drawn. The third bin 83*a* is set so as to house not only record sheets on which an image due to the second host computer is drawn, but also those on which an image due to the first host computer is drawn. The fourth and fifth bins 84*a* and 85*a* are set so as to house not only record sheets on which an image due to the third host computer is drawn, but also those on which an image due to the fourth host computer is drawn. The sixth bin 86*a* is set so as to house not only record sheets on which an image due to the fourth host computer is drawn, but also those on which an image due to the third host computer is drawn.

The embodiment is configured so that, for each of the bins 81*a*, 82*a*, 83*a*, 84*a*, 85*a*, and 86*a*, the number of record sheets housed in the bin can be detected.

For example, a record sheet 99 on which an image due to the second host computer is drawn is usually housed in the third bin 83*a*. If it is judged that the third bin 83*a* is full, the record sheet is discharged to one of bins which are not the third bin 83*a* and which are not the fourth to sixth bins 84*a*, 85*a*, and 86*a* which are set so as to be dedicated to the third and fourth host computers, i.e., one of the first and second bins 81*a* and 82*a*.

Figure 11:
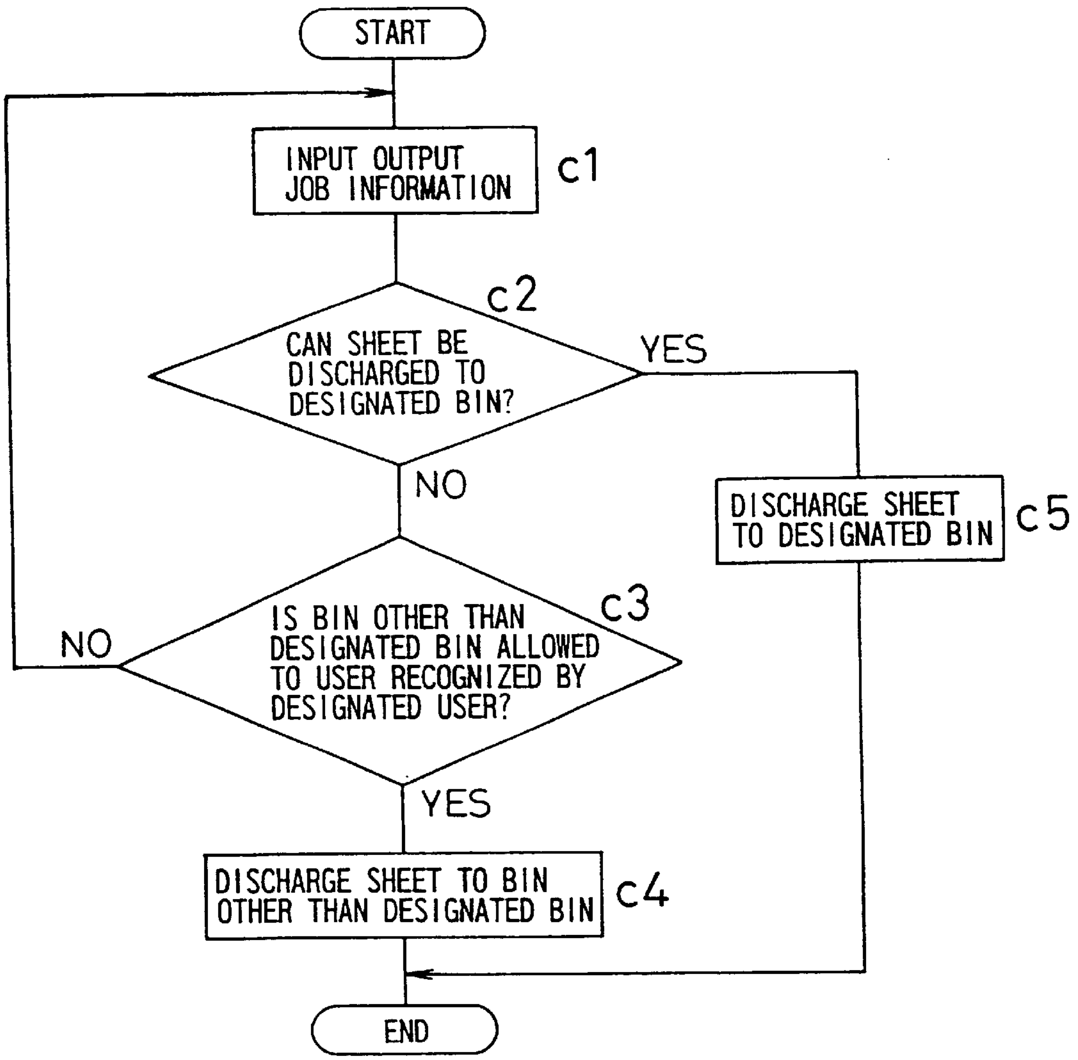
FIG. 11 is a flowchart showing a record sheet discharging operation of a digital image forming apparatus having the post-process section 34*c;*

FIG. 11 is a flowchart showing a record sheet discharging operation of a digital image forming apparatus having the post-process section 34*c*. In step c1, output JOB information is inputted from a host computer connected to the apparatus. The output JOB information includes the number of record sheets and that of copy sets, in addition to the image data and the identification data. In step c2, a designated bin which is set so as to correspond to the host computer is detected on the basis of the identification data, and it is judged whether a record sheet can be discharged to the designated bin or not. The capacity of the bin is obtained. If it is judged that there is room with respect to the capacity and a further record sheet can be discharged to the bin, the control proceeds to step c5 to discharge a record sheet to the designated bin. If it is judged that the designated bin is full and no further record sheet can be discharged to the bin, the control proceeds to step c3.

In step c3, it is judged whether or not a bin other than the designated bin is set so that a record sheet on which an image due to the host computer is drawn can be discharged to the bin. If it is not judged that such discharge is enabled, the control returns to step c1 without discharging a record sheet. If it is judged that such discharge is enabled, a record sheet is discharged in step c4 to a bin which is not the designated bin and which is set so that such discharge is enabled.

According to the third embodiment, among record sheets which are judged to have no bin to which the record sheets can be discharged, only a record sheet on which an image is formed on the basis of image data supplied from a predetermined host computer is discharged to a predetermined bin. Therefore, the bins are prevented from being used by many and unspecified computers, and order of designated bins can be maintained.

The third embodiment may be executed with being combined with one of the first and second embodiments.

Next, a fourth embodiment of the invention will be described. The fourth embodiment is characterized in that the first embodiment is modified so as to output information indicating that a record sheet which is judged that cannot be discharged to a corresponding bin is discharged to another bin. Referring to FIG. 6, therefore, first to sixth display devices 91*a*, 92*a*, 93*a*, 94*a*, 95*a*, and 96*a* serving as outputting devices are disposed for the first to sixth bins 81*a*, 82*a*, 83*a*, 84*a*, 85*a*, and 86*a*, respectively.

If it is judged that the sixth bin 86*a* is full, for example, a record sheet 99 on which an image due to the third host computer is drawn is discharged to a bin which is not the sixth bin 86*a* and which is one of the second, third, and fifth bins 82*a*, 83*a*, and 85*a*. When the record sheet is discharged to the fifth bin 85*a*, information indicating that such a record sheet is discharged is displayed on the display device 95*a* disposed on the fifth bin 85*a*. For example, the displayed contents include the label of the host computer, and information indicating that a record sheet due to a host computer which is not designated exists. The display may be conducted so as to blink.

Figure 12:
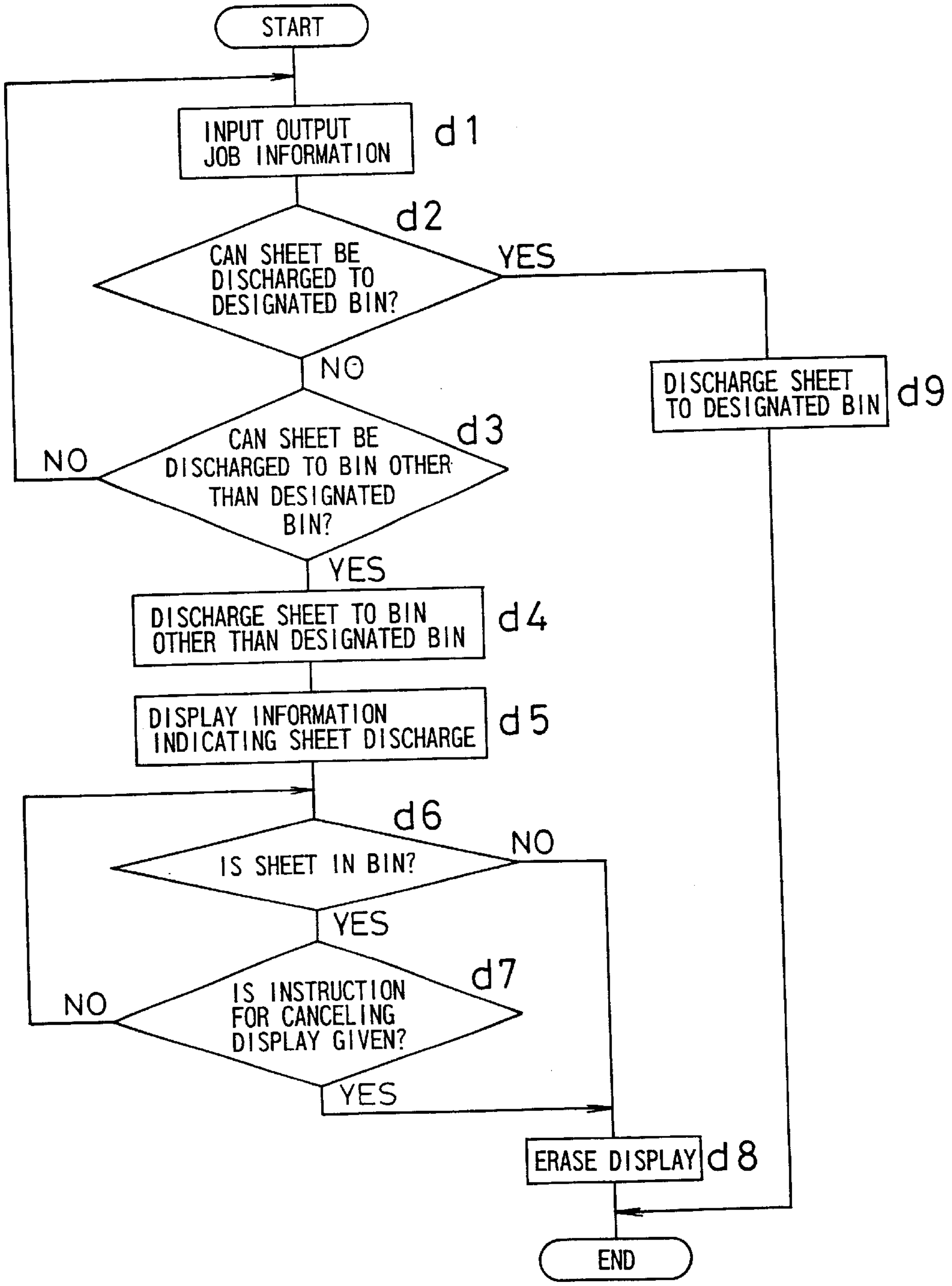
FIG. 12 is a flowchart illustrating a record sheet discharging operation of a digital image forming apparatus which is a fourth embodiment.

FIG. 12 is a flowchart illustrating a record sheet discharging operation of a digital image forming apparatus which is the fourth embodiment. In step d1, output JOB information is inputted from a host computer connected to the apparatus. In step d2, a designated bin which is set so as to correspond to the host computer is detected on the basis of the identification data, and it is judged whether a record sheet can be discharged to the designated bin or not. The capacity of the bin is obtained. If it is judged that there is room with respect to capacity and a further record sheet can be discharged to the bin, the control proceeds to step d9 to discharge a record sheet to the designated bin. If it is judged that the designated bin is full and no further record sheet can be discharged to the bin, the control proceeds to step d3.

In step d3, it is judged whether a bin other than the designated bin is set to be dedicated to a predetermined host computer or not. If it is judged that the bin is a dedicated one, the control returns to step d1 without discharging a record sheet. If it is judged that the bin is not a dedicated one, a record sheet is discharged in step d4 to a bin other than the designated bin.

In step d5, information indicating that a record sheet is discharged is displayed on the display device corresponding to the bin. In step d6, it is judged whether there is a record sheet in the bin or not. If it is judged that there is a record sheet in the bin, the control proceeds to step d7. If it is judged that there is not a record sheet in the bin, the display is erased in step d8. In step d7, it is judged whether an instruction for canceling the display is given or not. If it is judged that such an instruction is given, the control proceeds to step d8, and, if it is judged that such an instruction is not given, the control returns to step d6.

According to the fourth embodiment, information is output which indicates that a record sheet that is judged to have no bin to which the record sheet can be discharged, i.e., a record sheet that is judged to be originated from a host computer for which no bin is designated, or a record sheet that is judged to have a designated bin which is filled with record sheets is discharged to a predetermined bin. Consequently, the operator can carefully separately collect record sheets in accordance with the output of the information.

When the record sheet discharged to the bin is removed from the bin, the information output is stopped. Consequently, the operator can collect record sheets without concern for the above-mentioned discharge of the record sheet that is judged to have no bin to which the record sheet can be discharged.

Furthermore, information indicating that a record sheet that is judged to have no bin to which the record sheet can be discharged is discharged to a bin is output by means of display. Consequently, the operator can visually recognize the display, and carefully separately collect record sheets. Preferably, when the record sheet discharged to the bin is removed from the bin, the display is canceled.

The fourth embodiment may be executed with being combined with one of the first and second embodiments.

Figure 13:
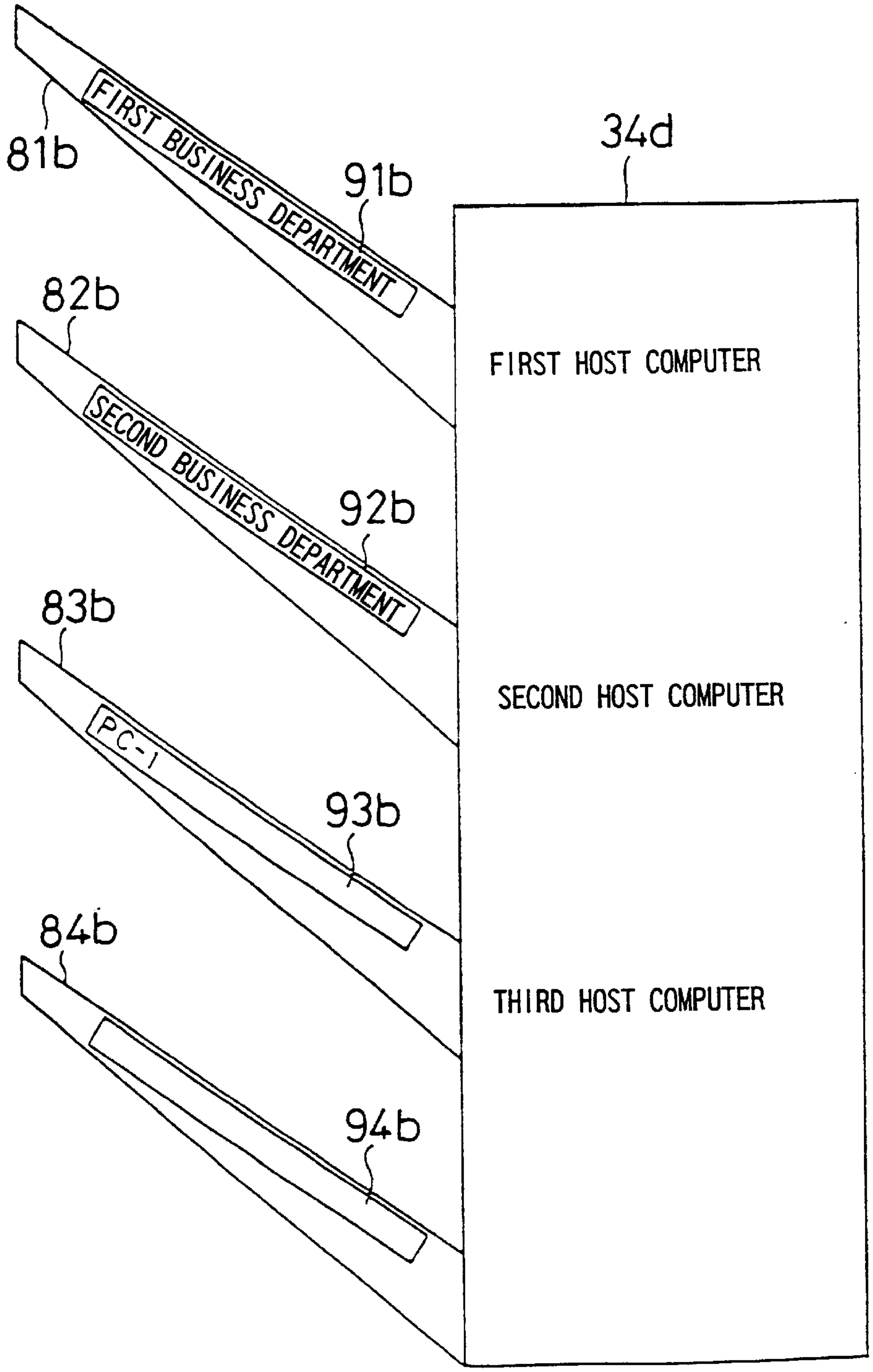
FIG. 13 is a side view showing a post-process section 34*d* which is a fifth embodiment of the invention.

FIG. 13 is a side view showing a post-process section 34*d* which is a fifth embodiment of the invention. In the embodiment, the digital copier 30 is used with being connected to at least first to third host computers.

The post-process section 34*d* of the embodiment comprises first to fourth bins 81*b*, 82*b*, 83*b*, and 84*b*. The first bin 81*b* is set so as to correspond to the first host computer. A record sheet on which an image is formed on the basis of image data supplied from the first host computer is discharged to the first bin 81*b*. The second bin 82*b* is set so as to correspond to the second host computer. A record sheet on which an image is formed on the basis of image data supplied from the second host computer is discharged to the second bin 82*b*. The third bin 83*b* is set so as to correspond to the third host computer. A record sheet on which an image is formed on the basis of image data supplied from the third host computer is discharged to the third bin 83*b*. The fourth bin 84*b* is not designated for the host computers, so that the first to third host computers and other connected computers can use the fourth bin 84*b*.

First to fourth display devices 91*b*, 92*b*, 93*b*, and 94*b* serving as the informing means are disposed for the first to fourth bins 81*b*, 82*b*, 83*b*, and 84*b*, respectively. On each of the display devices, the label of the corresponding host computer is always displayed.

When the first bin 81*b* which is already designated so as to correspond to the first host computer is disposed to be set so as to correspond to a computer other than the first host computer, for example, the first display device 91*b* displays information indicating that the first bin 81*b* is already designated, thereby causing the operator to be informed of the earlier designation.

Figure 14:
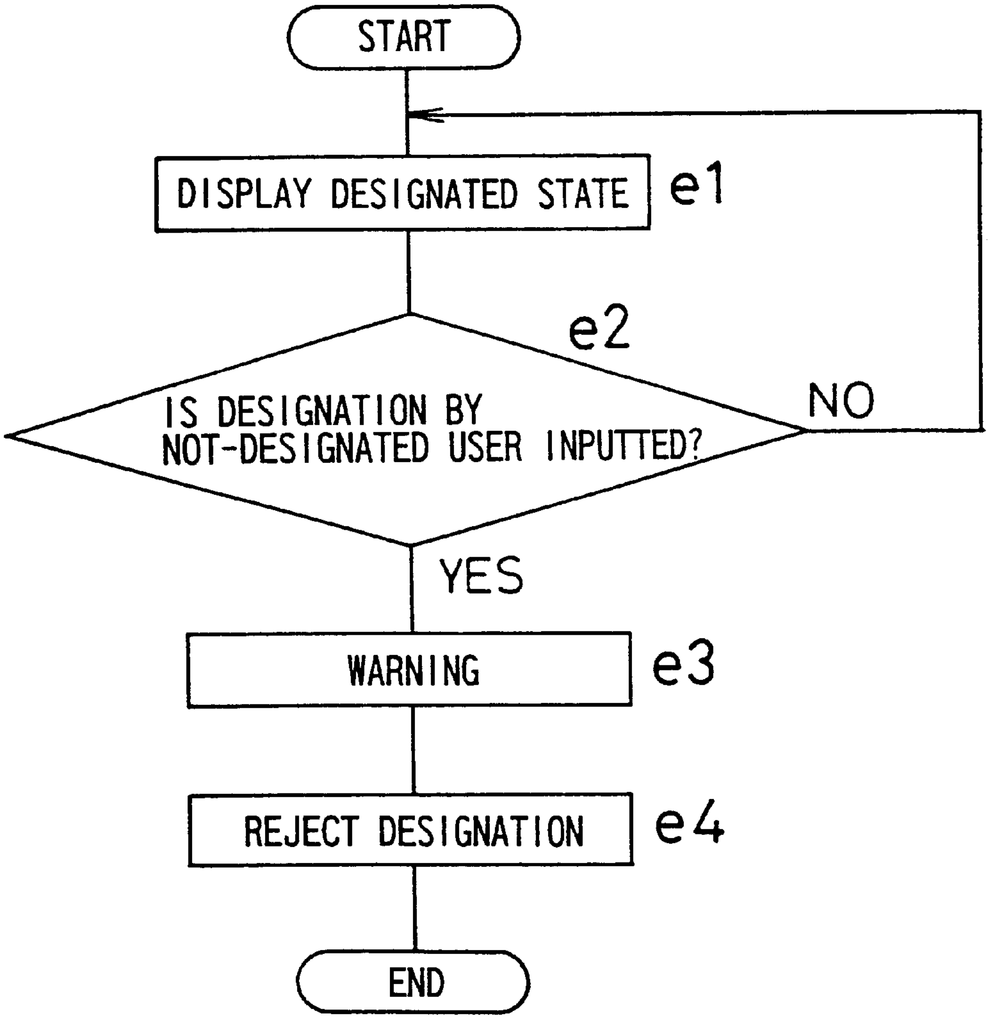
FIG. 14 is a flowchart illustrating an informing operation of a digital image forming apparatus having the post-process section 34*d*.

FIG. 14 is a flowchart illustrating an informing operation of a digital image forming apparatus having the post-process section 34*d*. In step e1, the display devices 91*b*, 92*b*, 93*b*, and 94*b* display the respective designation states. In step e2, it is judged whether a bin which is already designated so as to correspond to a host computer is disposed to be newly set so as to correspond to another host computer or not. If it is judged that such new designation is disposed to be done, information indicating that the bin is already designated is displayed in step e3, thereby warning the operator of the earlier designation. Furthermore, the storage of the new designation is rejected in step e4. If it is judged in step e2 that such new designation is not disposed to be done, the control returns to step e1.

According to the fifth embodiment, a record sheet on which an image is formed on the basis of image data supplied from a host computer is discharged to a designated bin. When a bin which is stored in correspondence with a host computer is designated for another host computer, it is informed that the bin is already designated, and storage of the new designation is rejected. Consequently, a bin which is already designated for a computer is prevented from being designated for another computer, and convenience can be enhanced.

The display devices 91*b*, 92*b*, 93*b*, and 94*b* are disposed on the bins 81*b*, 82*b*, 83*b*, and 84*b*, respectively. Alternatively, the display devices may be disposed on the body of the post-process section 34*d*, or in the operation panel 23 of the digital image forming apparatus. The display may be conducted on the display section 1, or a display screen of a host computer. The informing means is not restricted to a display device, and may be a device such as that which outputs a voice sound.

Next, a sixth embodiment of the invention will be described. The post-process section of the sixth embodiment is configured in the same manner as the post-process section 34*d* of the fifth embodiment shown in FIG. 13 except the display devices 91*b*, 92*b*, 93*b*, and 94*b*.

In the embodiment, a bin is designated for each of the host computers, only for an effective period which is the predetermined first period. When the effective period elapses, the storage contents due to the designation are erased.

Preferably, storage contents are held when the effective period elapses and a record sheet is housed in a designated bin.

Preferably, a second period which is shorter than the effective period is set, and, when the effective period has not yet elapsed and a record sheet is not discharged to a designated bin during the second period, storage contents are erased.

Preferably, an image forming apparatus of the sixth embodiment is configured in the same manner as the fifth embodiment including the display devices 91*b*, 92*b*, 93*b*, and 94*b* as warning means, and the apparatus further comprises a timer for measuring a time. When a difference between a timing when the effective period elapses and the time measured by the timer is not longer than a predetermined period, information indicating that the effective period is drawing to an end is displayed to give a warning.

Figure 15:
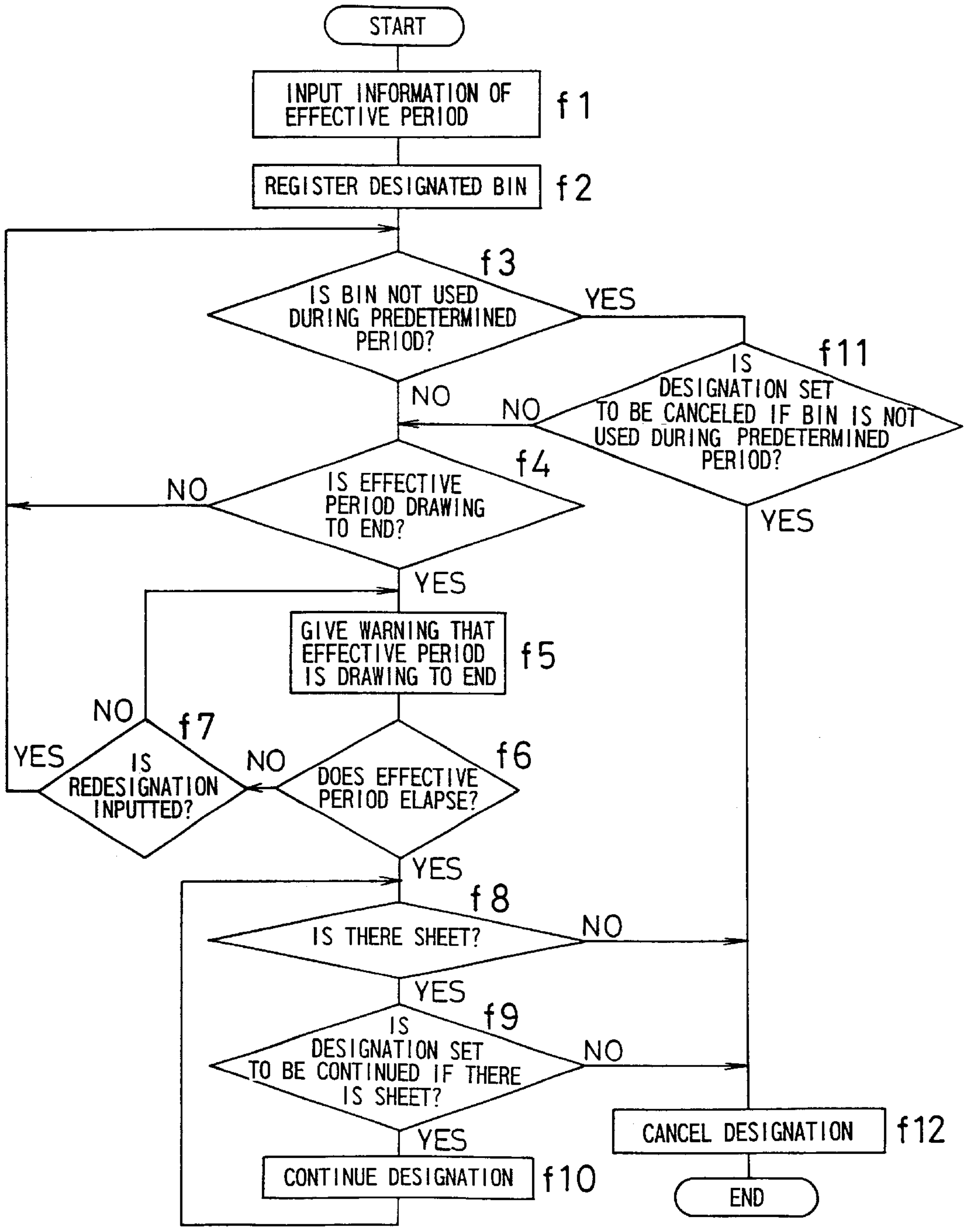
FIG. 15 is a flowchart showing a designating operation of a digital image forming apparatus which is a sixth embodiment.

FIG. 15 is a flowchart showing a designating operation of a digital image forming apparatus which is a sixth embodiment.

In step f1, the effective period and the second period are input to be set. In step f2, bins are designated so as to respectively correspond to host computers and then registered.

It is judged in step f3 whether an operation of discharging a record sheet to a bin is conducted during the second period or not. If it is judged that a discharging operation is not conducted, it is judged in step f11 whether or not stored contents of designation are set so as to be erased when a discharging operation is not conducted during the second period.

If it is judged that such setting is done, designated storage contents are erased in step f12. If it is judged that such setting is not done, the control proceeds to step f4.

If it is not judged in step f3 that a discharging operation is not conducted, or if a record sheet is discharged during the second period, the control proceeds to step f4.

In step f4, it is judged whether or not the difference between a timing when the effective period elapses and the time measured by the timer is not longer than a predetermined period, or the effective period is drawing to an end. If it is judged that the effective period is drawing to an end, warning that the effective period is drawing to an end is given in step f5 by means of, for example, display. If it is judged that the effective period is not drawing to an end, the control returns to step f3.

In step f6, it is judged whether the effective period has elapsed or not. If it is judged that the effective period has elapsed, it is judged in step f8 whether there is a record sheet in a designated bin or not. If it is judged that there is a record sheet, it is judged in step f9 whether or not the designation of a bin in correspondence with a host computer is set so as to be continued if there is a record sheet. If it is judged that such setting is done, the designation is continued in step f10 and the control returns to step f8.

If it is judged in step f8 that there is not a record sheet, or if it is judged in step f9 that the designation is not set so as to be continued, the control proceeds to step f12 in which the designated storage contents are erased and the designation is canceled.

If it is judged in step f6 that the effective period has not yet elapsed, it is judged in step f7 whether or not the designated storage contents are set so as to be continued even after the effective period has elapsed. If it is judged that such setting is done, the control returns to step f3, and, if it is judged that such setting is not done, the control returns to step f5.

According to the sixth embodiment, a record sheet on which an image is formed on the basis of image data supplied from a host computer is discharged to a designated bin. A bin is designated for each of the host computers only for the effective period. When the effective period elapses, the storage contents due to the designation are erased. Therefore, a bin is prevented from being occupied by one computer, and the bins can be effectively used by a larger number of computers.

When the effective period elapses and a record sheet is housed in a bin which is designated and stored, storage contents are held. Therefore, it is possible to know the computer from which the record sheet housed in the bin is originated.

When the effective period has not yet elapsed and a record sheet is not discharged during the second period to a bin which is designated and stored, storage contents are erased. Therefore, a bin is prevented from being occupied by one computer, and the bins can be effectively used by a larger number of computers.

Since warning that the effective period is drawing to an end is given, the effective period is prevented from expiring without attracting the notice of the operator, whereby convenience can be enhanced.

A timing when the effective period starts is set to coincide with that when a bin is designated for each of the computers. Therefore, a larger number of computers can be equally provided with an opportunity of using the bins. For example, the effective period is set to be a period of three months starting from the date when a bin is designated, and the second period is set to be one week. In this case, even when the period of three months has not yet elapsed, the designation is canceled when a record sheet is not discharged during one week.

A timing when the effective period starts is set to coincide with a timing when a record sheet is lastly discharged to a bin. Therefore, the bin is prevented from being occupied by one computer for a long term while no record sheet is discharged. For example, the effective period is set to be a period of one week starting from the data when a record sheet is lastly discharged. When a record sheet is not discharged during one week, the designation is canceled.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus comprising:

image forming means for forming an image on a record sheet based on image data supplied from connected terminal apparatuses;

discharging means for discharging the record sheet on which the image is formed;

a plurality of bins for housing discharged record sheets;

bin designating means for designating a bin for each of the terminal apparatuses when the image data is supplied from a terminal apparatus to the image forming apparatus;

record sheet number detecting means for detecting a number of record sheets housed in the bins; and priority setting means for setting priorities for the bins to which a record sheet may be discharged;

wherein when the designating bin is filled with the record sheets an additional sheet is discharged to another bin according to the priorities, and wherein the bin designation means designates a bin only for a predetermined period of time and storing means for canceling information stored in the storing means when the predetermined period of time ends.

2. The image forming apparatus of claim 1, wherein a start point of time of the predetermined period designated by the bin designating means coincides with a point of time when a bin is designated for each of the terminal apparatuses.

* * * * *